US012703072B2

(12) United States Patent
Asami et al.

(10) Patent No.: US 12,703,072 B2
(45) Date of Patent: Aug. 11, 2026

(54) RECIPROCATING TOOL, AND METHOD FOR DETECTING OCCURRENCE OF MALFUNCTION ASSOCIATED WITH POSITION DETECTION OF RECIPROCATING MEMBER IN RECIPROCATING TOOL

(71) Applicant: MAKITA CORPORATION, Anjo (JP)

(72) Inventors: Naoya Asami, Anjo (JP); Kosuke Goto, Anjo (JP); Yuki Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/217,740

(22) Filed: May 23, 2025

(65) Prior Publication Data

US 2025/0360607 A1 Nov. 27, 2025

(30) Foreign Application Priority Data

May 24, 2024 (JP) ................................ 2024-085135

(51) Int. Cl.
*B25C 5/15* (2006.01)

(52) U.S. Cl.
CPC ..................................... *B25C 5/15* (2013.01)

(58) Field of Classification Search
CPC ................................... B25C 5/15; B25C 1/06
See application file for complete search history.

(56) References Cited

U.S. PATENT DOCUMENTS

| | | | |
|---|---|---|---|
| 5,415,136 A | 5/1995 | Doherty et al. |
| 6,123,241 A | 9/2000 | Walter et al. |
| 6,971,567 B1 | 12/2005 | Cannaliato et al. |
| 7,652,442 B2 | 1/2010 | Miyazaki et al. |
| 7,728,553 B2 | 6/2010 | Carrier et al. |
| 7,918,374 B2 | 4/2011 | Gardner et al. |

(Continued)

FOREIGN PATENT DOCUMENTS

| | | |
|---|---|---|
| JP | 5564690 B2 | 7/2014 |
| JP | 2019-098456 A | 6/2019 |

(Continued)

OTHER PUBLICATIONS

Mar. 9, 2026 Office Action issued in U.S. Appl. No. 19/217,652.
Apr. 9, 2026 Office Action issued in U.S. Appl. No. 19/217,581.

*Primary Examiner* — Thomas M Wittenschlaeger
(74) *Attorney, Agent, or Firm* — Oliff PLC

(57) ABSTRACT

One aspect of the present disclosure provides a reciprocating tool including a reciprocating member, a first position detector, a second position detector, and a control circuit. The control circuit detects occurrence of malfunction associated with the first position detector or the second position detector based on (i) the control circuit having failed to receive a second position detection signal from the second position detector between an mth reception and an (m-1)th reception of a first position detection signal from the first position detector or (ii) the control circuit having failed to receive the first position detection signal between an nth reception and an (n-1)th reception of the second position detection signal, where m and n are any integers greater than or equal to two.

19 Claims, 15 Drawing Sheets

(56) References Cited

U.S. PATENT DOCUMENTS

| | | | | |
|---|---|---|---|---|
| 8,070,031 | B2 | 12/2011 | Moeller et al. | |
| 8,393,512 | B2 | 3/2013 | Tanimoto et al. | |
| 8,779,708 | B2 | 7/2014 | Miyazaki | |
| 10,486,295 | B2 | 11/2019 | Aradachi et al. | |
| 11,648,653 | B2 | 5/2023 | Baba | |
| 2012/0274245 | A1 | 11/2012 | Takano et al. | |
| 2013/0033233 | A1 | 2/2013 | Noda et al. | |
| 2013/0098646 | A1 | 4/2013 | Funabashi et al. | |
| 2014/0263535 | A1 | 9/2014 | Rajani et al. | |
| 2019/0168366 | A1* | 6/2019 | Yasutomi | B25C 1/047 |
| 2020/0114500 | A1 | 4/2020 | Bierdeman et al. | |
| 2021/0354277 | A1 | 11/2021 | Morimura | |
| 2022/0134524 | A1 | 5/2022 | Shioya et al. | |
| 2023/0042139 | A1* | 2/2023 | Nolte | H02K 29/08 |
| 2023/0137720 | A1 | 5/2023 | Aizawa et al. | |
| 2023/0278177 | A1 | 9/2023 | Julius et al. | |
| 2023/0405782 | A1 | 12/2023 | Tsai et al. | |
| 2023/0415316 | A1* | 12/2023 | Tsai | B25F 5/00 |
| 2023/0415319 | A1 | 12/2023 | Tsai et al. | |
| 2024/0131675 | A1 | 4/2024 | Leathrum et al. | |
| 2024/0253196 | A1 | 8/2024 | Miller et al. | |
| 2024/0253197 | A1 | 8/2024 | Spayer et al. | |
| 2024/0278399 | A1 | 8/2024 | Akiba et al. | |
| 2025/0222578 | A1 | 7/2025 | Yang | |
| 2025/0289106 | A1 | 9/2025 | Jiang et al. | |

FOREIGN PATENT DOCUMENTS

| | | | |
|---|---|---|---|
| JP | 6555423 | B2 | 8/2019 |
| JP | 6794663 | B2 | 12/2020 |
| JP | 2022-058080 | A | 4/2022 |

* cited by examiner

FIG. 7
STATE OF POWER-SUPPLY CIRCUIT
ON
OFF
STATE OF CONTACT SWITCH
OFF
ON
STATE OF TRIGGER SWITCH
OFF
ON
OUTPUT OF SECOND LATCHING CIRCUIT (CUR)
HIGH
LOW
OPERATION OF TRIGGER SWITCH
DETECTED
NOT DETECTED
STOP PREPARATION POSITION (OUTPUT OF FIRST HALL ELEMENT)
NOT DETECTED
DETECTED
STANDBY POSITION (OUTPUT OF SECOND HALL ELEMENT)
NOT DETECTED
DETECTED
STATE OF SELECTED HIGH-SIDE SWITCH
ON
OFF
STATE OF SELECTED LOW-SIDE SWITCH
ON
OFF
STATE OF SEVENTH SWITCH
ON
OFF
OUTPUT OF FIRST LATCHING CIRCUIT (POS)
HIGH
LOW
STATE OF FIRST SIGNAL CUTOFF CIRCUIT
DISABLED
ENABLED
INITIAL DUTY RATIO
SOFT START
100%
0%
INITIAL DUTY RATIO
SOFT START
100%
0%
FREE-RUN STATE
PWM SIGNAL CUTOFF
BRAKE

RECIPROCATING TOOL, AND METHOD FOR DETECTING OCCURRENCE OF MALFUNCTION ASSOCIATED WITH POSITION DETECTION OF RECIPROCATING MEMBER IN RECIPROCATING TOOL

CROSS-REFERENCE TO RELATED APPLICATIONS

The present application claims the benefit of Japanese Patent Application No. 2024-085135 filed on May 24, 2024 with the Japan Patent Office, the entire disclosure of which is incorporated herein by reference.

BACKGROUND

The present disclosure relates to a reciprocating tool.

Japanese Patent No. 6555423 discloses a driver including first and second permanent magnets and first and second Hall elements. The first permanent magnet is disposed on a pin wheel so that the first Hall element detects a magnetic field of the first permanent magnet when a piston of the driver reaches a standby position. The pin wheel moves in conjunction with the piston. The second permanent magnet is disposed on the pin wheel so that the second Hall element detects a magnetic field of the second permanent magnet when the piston of the driver reaches an adjustment position.

SUMMARY

In the above-described driver, when malfunction occurs to the first Hall element and the first Hall element fails to detect the magnetic field of the first permanent magnet, a controller of the driver does not stop a motor. Consequently, a driver blade may not stop, and the next nail may be ejected from the driver against the user's intention.

In one aspect of the present disclosure, it is desirable to provide a technique capable of detecting occurrence of malfunction associated with position detection of a reciprocating member in a reciprocating tool.

In the present disclosure, it should be noted that the terms such as "first" and "second" are intended simply to distinguish elements from each other, and are not intended to limit the order or the number of the elements. The first element may be referred to as the second element, and similarly, the second element may be referred to as the first element. In addition, the first element may be included without the second element, and similarly, the second element may be included without the first element.

One aspect of the present disclosure provides a reciprocating tool including a reciprocating member, a first position detector, a second position detector, and a control circuit.

The reciprocating member is configured to reciprocate between first dead center and second dead center.

The first position detector is configured to output a first position detection signal each time the reciprocating member reaches a first position in at least one reciprocating motion thereof.

The second position detector is (i) distinct from the first position detector, and (ii) configured to output a second position detection signal each time the reciprocating member reaches a second position in the at least one reciprocating motion thereof. The second position is located after the first position in the at least one reciprocating motion of the reciprocating member.

The control circuit is configured (i) to receive the first position detection signal from the first position detector, (ii) to receive the second position detection signal from the second position detector, and (iii) to detect occurrence of malfunction associated with the first position detector or the second position detector based on (A) the control circuit having failed to receive the second position detection signal between an mth reception and an (m-1)th reception of the first position detection signal or (B) the control circuit having failed to receive the first position detection signal between an nth reception and an (n-1)th reception of the second position detection signal, where m and n are any integers greater than or equal to two.

With the reciprocating tool configured as above, malfunction associated with position detection of the reciprocating member, more specifically, occurrence of malfunction associated with the first position detector or the second position detector can be detected.

Another aspect of the present disclosure provides a method for detecting occurrence of malfunction associated with position detection of a reciprocating member in a reciprocating tool, the method including:

- reciprocating the reciprocating member between first dead center and second dead center;
- receiving a first position detection signal from a first position detector in the reciprocating tool, the first position detector being configured to output the first position detection signal each time the reciprocating member reaches a first position in at least one reciprocating motion thereof;
- receiving a second position detection signal from a second position detector in the reciprocating tool, the second position detector being configured to output the second position detection signal each time the reciprocating member reaches a second position in the at least one reciprocating motion thereof, the second position being located after the first position in the at least one reciprocating motion of the reciprocating member; and
- detecting occurrence of malfunction associated with the first position detector or the second position detector based on (i) failure to receive the second position detection signal between an mth reception and an (m-1)th reception of the first position detection signal or (ii) failure to receive the first position detection signal between an nth reception and an (n-1)th reception of the second position detection signal, where m and n are any integers greater than or equal to two.

The method as above can detect occurrence of malfunction associated with position detection of the reciprocating member, more specifically, occurrence of malfunction associated with the first position detector or the second position detector.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

1. Overview of Embodiments

Figure 1:
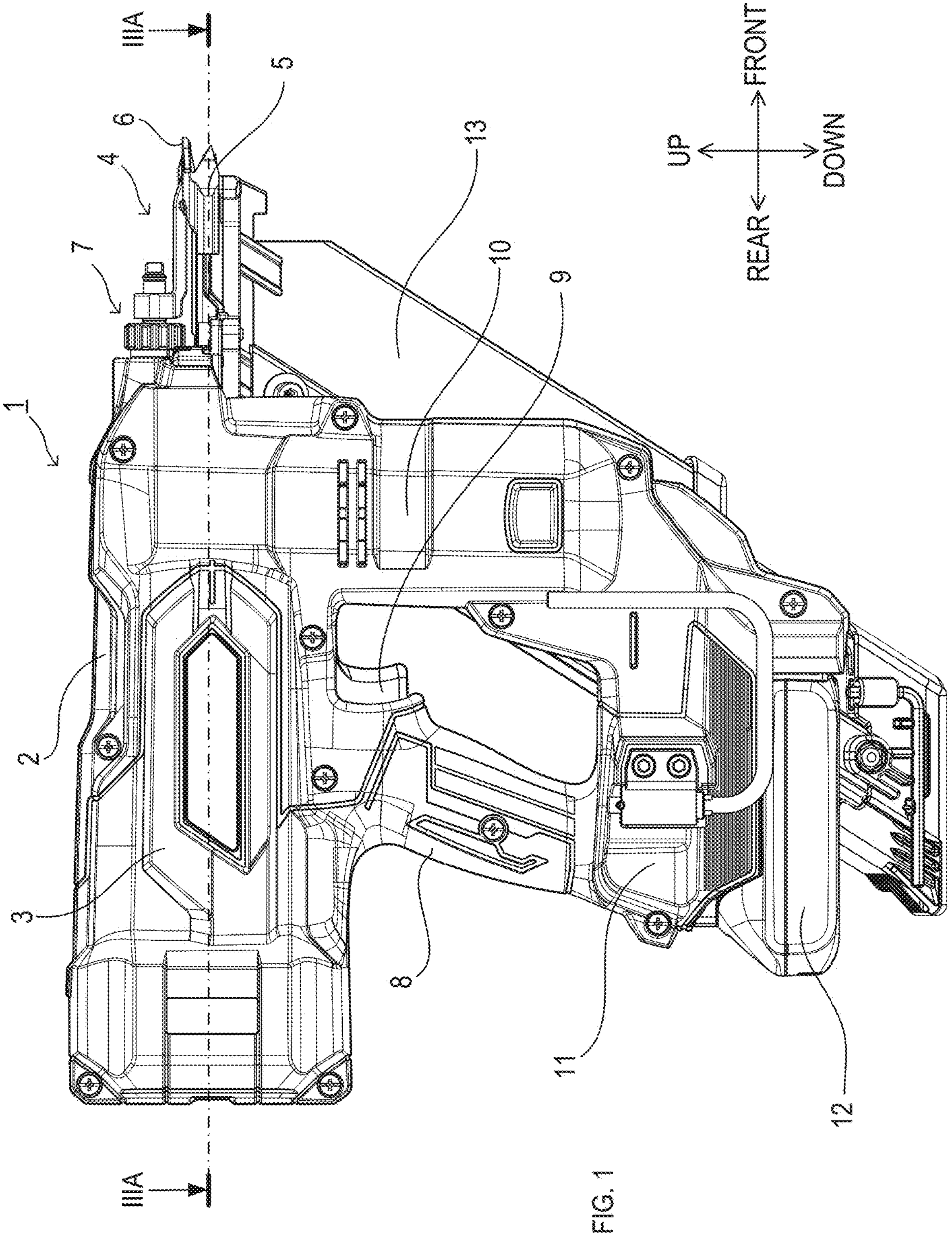
FIG. 1 is an external view of a reciprocating tool in an example embodiment.

One embodiment may provide a reciprocating tool including at least any one of:

- Feature 1: a reciprocating member configured to reciprocate between first dead center and second dead center;
- Feature 2: a first position detector configured to output a first position detection signal each time the reciprocating member reaches a first position (or a first phase, or a first phase angle) in at least one reciprocating motion thereof;
- Feature 3: a second position detector (i) distinct from the first position detector, and (ii) configured to output a second position detection signal each time the reciprocating member reaches a second position (or a second phase, or a second phase angle) in the at least one reciprocating motion thereof;
- Feature 4: the second position is located after the first position in the at least one reciprocating motion of the reciprocating member;
- Feature 5: a control circuit;
- Feature 6: the control circuit is configured (or programmed) to receive the first position detection signal from the first position detector;
- Feature 7: the control circuit is configured (or programmed) to receive the second position detection signal from the second position detector; and
- Feature 8: the control circuit is configured (or programmed) to detect occurrence of malfunction associated with the first position detector or the second position detector based on (i) the control circuit having failed to receive the second position detection signal between an mth reception and an (m-1)th reception of the first position detection signal or (ii) the control circuit having failed to receive the first position detection signal between an nth reception and an (n-1)th reception of the second position detection signal, where m and n are any integers greater than or equal to two.

The reciprocating tool including at least Features 1 through 8 can detect occurrence of malfunction associated with position detection of the reciprocating member, more specifically, occurrence of malfunction associated with the first position detector or the second position detector.

Examples of the reciprocating tool include an electric nailer, an electric rebar tier, an electric rebar cutter, an electric lubricator, and an electric inflator. Examples of the electric lubricator include an electric grease gun.

In one embodiment, the control circuit may be integrated into a single electronic unit or a single electronic device or a single circuit board.

In one embodiment, the control circuit may be a combination of two or more electronic circuits or two or more electronic units or two or more electronic devices provided separately on or in the reciprocating tool.

In one embodiment, the control circuit may include a microcomputer (or a microcontroller or a microprocessor), wired logic, an application specific integrated circuit (ASIC), an application specific standard product (ASSP), a programmable logic device (PLD) (such as a field programmable gate array (FPGA)), a discrete electronic component, and/or any combination of the foregoing.

One embodiment may include, in addition to or in place of at least any one of Features 1 through 8, at least any one of:

- Feature 9: a first manual switch configured to be manually operated by a user of the reciprocating tool;
- Feature 10: an electric motor configured to generate a driving force;
- Feature 11: a drive circuit configured to drive the electric motor;
- Feature 12: a transmission device configured to transmit the driving force of the electric motor to the reciprocating member at least in a stroke of the reciprocating member from the second dead center to the first dead center; and
- Feature 13: the control circuit is configured (or programmed) to control the drive circuit so as to drive the electric motor based on at least the first manual switch being manually operated.

In the reciprocating tool including at least Features 1 through 13, the user can drive the reciprocating member at least from the second dead center to the first dead center by manually operating the first manual switch.

Examples of the first manual switch include a trigger switch, a pushbutton switch, a dial switch, a slide switch, a tactile switch, a joystick, a touch panel, a touch screen, and a graphical user interface (GUI).

Examples of the electric motor include a DC motor, an AC motor, and a stepper motor. Examples of the DC motor include a brushless DC motor, and a brushed DC motor.

Examples of the drive circuit include a full-bridge circuit and a half-bridge circuit.

One embodiment may include, in addition to or in place of at least any one of Features 1 through 13:

- Feature 14: the transmission device includes a reducer (or a reduction drive) (i) having a preset deceleration ratio, and (ii) configured to convert the driving force of the electric motor into a decelerated output and transmit the decelerated output to the reciprocating member.

In the reciprocating tool including at least Features 1 through 14, the reciprocating member can be driven at least from the second dead center to the first dead center at a torque proportional to the deceleration ratio of the reducer.

Examples of the reducer include a gear reducer. Examples of the gear reducer include a parallel gear reducer, an orthogonal gear reducer, and a concentric gear reducer. Examples of the concentric gear reducer include a planetary gear reducer.

One embodiment may include, in addition to or in place of at least any one of Features 1 through 14:

Feature 15: the control circuit is configured (or programmed) to control the drive circuit so as to stop driving of the electric motor based on the control circuit detecting the occurrence of malfunction.

In the reciprocating tool including at least Features 1 through 13 and 15, the electric motor can be inhibited from continuing to be driven when malfunction occurs in the first position detector or the second position detector.

One embodiment may include, in addition to or in place of at least any one of Features 1 through 15:

Feature 16: the control circuit is configured (or programmed) to control the drive circuit so as to brake the electric motor based on the control circuit detecting the occurrence of malfunction.

In the reciprocating tool including at least Features 1 through 13 and 16, rotation of the electric motor can be quickly stopped when malfunction occurs in the first position detector or the second position detector, and movement of the reciprocating member at least from the second dead center to the first dead center can be quickly stopped.

One embodiment may include, in addition to or in place of at least any one of Features 1 through 16, at least any one of:

Feature 17: the electric motor includes a rotor;

Feature 18: a rotational position detector configured to output, to the control circuit, a rotational position signal indicating that the rotor has rotated by a specified angle; and Feature 19: the control circuit is configured (or programmed) to invalidate the mth reception of the first position detection signal or the nth reception of the second position detection signal based on (i) failure to receive a predefined number of rotational position signals from the rotational position detector between the mth reception and the (m-1)th reception of the first position detection signal, or (ii) failure to receive the predefined number of rotational position signals from the rotational position detector between the nth reception and the (n-1)th reception of the second position detection signal.

In the reciprocating tool including at least Features 1 through 13 and 17 through 19, even if the control circuit receives electrical noise as the first position detection signal or the second position detection signal at a timing when the electric motor has not brought the reciprocating member to the first position or the second position, the control circuit can be inhibited from erroneously detecting occurrence of malfunction.

Examples of the rotational position detector include a Hall effect sensor and a pulse encoder (or a rotary encoder). Examples of the rotational position signal include a pulse signal (or a square wave signal) and a sine wave signal.

One embodiment may include, in addition to or in place of at least any one of Features 1 through 19, at least any one of:

Feature 20: the control circuit is configured (or programmed) to output a pulse-width modulated signal to the drive circuit to control the drive circuit; and Feature 21: the drive circuit is configured to drive the electric motor based on the pulse-width modulated signal.

In the reciprocating tool including at least Features 1 through 13, 20 and 21, the control circuit can control the electric motor by the pulse-width modulated signal.

One embodiment may include, in addition to or in place of at least any one of Features 1 through 21, at least any one of:

Feature 22: a pressing member configured to be pressed against a workpiece by the user;

Feature 23: a second manual switch configured to be manually operated by the pressing member being pressed against the workpiece; and Feature 24: the control circuit is configured (or programmed) to control the drive circuit so as to drive the electric motor based on both the first manual switch and the second manual switch being manually operated.

In the reciprocating tool including at least Features 1 through 13 and 22 through 24, the electric motor can be inhibited from being accidentally driven when the pressing member is not pressed against the workpiece, in other words, when the user is not machining the workpiece.

One embodiment may include, in addition to or in place of at least any one of Features 1 through 24, at least any one of:

Feature 25: a cylinder (or a chamber) containing compressed gas therein;

Feature 26: a piston that (i) is inside the cylinder, and (ii) urges the reciprocating member toward the second dead center by the compressed gas; and Feature 27: the reciprocating member is configured to be driven from the first dead center to the second dead center by the piston.

In the reciprocating tool including at least Features 1 through 13 and 25 through 27, the reciprocating member can be moved from the first dead center to the second dead center by a pressure applied from the compressed gas to the piston.

Examples of the compressed gas include compressed air, and compressed inert gas. The compressed air may be compressed dry air.

Examples of the compressed inert gas include compressed nitrogen gas and compressed noble gas.

One embodiment may include, in addition to or in place of at least any one of Features 1 through 27, at least any one of:

Feature 28: the first position detector includes (i) a first magnet and (ii) a first Hall element configured to detect a first magnetic pole of the first magnet, and is configured such that the first Hall element detects the first magnetic pole of the first magnet and outputs the first position detection signal in response to the reciprocating member having reached the first position;

Feature 29: the second position detector includes (i) a second magnet and (ii) a second Hall element configured to detect a second magnetic pole of the second magnet, and is configured such that the second Hall element detects the second magnetic pole of the second magnet and outputs the second position detection signal in response to the reciprocating member having reached the second position; and Feature 30: the second magnetic pole has a polarity opposite to that of the first magnetic pole.

The reciprocating tool including at least Features 1 through 8 and 28 through 30 has great durability, compared with if the reciprocating tool were configured to mechanically detect the position of the reciprocating member. Furthermore, the reciprocating tool as such is not susceptible to dust in position detection of the reciprocating member, compared with if the reciprocating tool were configured to optically detect the position of the reciprocating member.

One embodiment may include, in addition to or in place of at least any one of Features 1 through 30, at least any one of:

Feature 31: the transmission device includes a cam (i) including an outer circumference having two or more pins aligned in a circumferential direction of the cam, and (ii) configured to rotate by the driving force of the electric motor;

Feature 32: the transmission device includes a holder (i) holding the first magnet and the second magnet, and (ii) configured to rotate with the cam; and Feature 33: the reciprocating member (i) extends between the first dead center and the second dead center, (ii) includes two or more racks in its extending direction, and (iii) is configured to be driven from the second dead center to the first dead center by each of the two or more racks engaging with a corresponding one of the two or more pins.

In the reciprocating tool including at least Features 1 through 13 and 28 through 33, the reciprocating member can be moved at least from the second dead center to the first dead center by the cam. In addition, reaching of the reciprocating member to the first position or the second position can be detected based on a rotational position of the holder that rotates with the cam.

One embodiment may include, in addition to or in place of at least any one of Features 1 through 33:

Feature 34: the first magnetic pole and the second magnetic pole face outward in a radial direction of the holder.

In the reciprocating tool including at least Features 1 through 13 and 28 through 34, the first Hall element and the second Hall element can be disposed outward from the holder in the radial direction. Consequently, the size of the reciprocating tool in a direction intersecting the radial direction of the holder can be reduced.

One embodiment may include, in addition to or in place of at least any one of Features 1 through 34, at least any one of:

Feature 35: the cam and the holder are configured to rotate around a common axis; and Feature 36: the electric motor includes a rotor serving as the common axis.

One embodiment may include, in addition to or in place of at least any one of Features 1 through 36:

Feature 37: the holder is a non-magnetic member.

In the reciprocating tool including at least Features 1 through 13, 28 through 33 and 37, it can be easier for the first Hall element or the second Hall element to detect the first magnetic pole or the second magnetic pole.

One embodiment may include, in addition to or in place of at least any one of Features 1 through 37:

Feature 38: the reciprocating member is configured (i) to be positioned at the first dead center in response to the piston being positioned at its top dead center, and (ii) to be positioned at the second dead center in response to the piston being positioned at its bottom dead center.

In the reciprocating tool including at least Features 1 through 13, 25 through 27 and 38, the maximum pressure of the compressed gas is applied to the reciprocating member, and the reciprocating member can be moved from the first dead center to the second dead center. In addition, the reciprocating member moving from the second dead center to the first dead center can be decelerated by the pressure of the compressed gas.

One embodiment may include, in addition to or in place of at least any one of Features 1 through 38, at least any one of:

Feature 39: the first position corresponds to a stop preparation position to prepare for a stopping operation of the reciprocating member; and Feature 40: the second position corresponds to (i) a stop position to stop the reciprocating member, and/or (ii) a standby position where the reciprocating member waits for at least one next reciprocating motion of the reciprocating member.

One embodiment may provide a method including at least any one of:

Feature 41: reciprocating a reciprocating member in a reciprocating tool between first dead center and second dead center (once, or at least twice);

Feature 42: receiving a first position detection signal from a first position detector in the reciprocating tool;

Feature 43: the first position detector is configured to output the first position detection signal each time the reciprocating member reaches a first position (or a first phase or a first phase angle) in at least one reciprocating motion thereof;

Feature 44: receiving a second position detection signal from a second position detector in the reciprocating tool;

Feature 45: the second position detector is (i) distinct from the first position detector, and (ii) configured to output the second position detection signal each time the reciprocating member reaches a second position (or a second phase or a second phase angle) in the at least one reciprocating motion thereof;

Feature 46: the second position is located after the first position in the at least one reciprocating motion of the reciprocating member; and Feature 47: detecting occurrence of malfunction associated with the first position detector or the second position detector based on (i) failure to receive the second position detection signal between an mth reception and an (m-1)th reception of the first position detection signal, or (ii) failure to receive the first position detection signal between an nth reception and an (n-1)th reception of the second position detection signal, where m and n are any integer greater than or equal to two.

The method including at least Features 41 through 47 can detect occurrence of malfunction associated with position detection of the reciprocating member, more specifically, occurrence of malfunction associated with the first position detector or the second position detector.

In one embodiment, Features 1 through 47 may be combined in any combination.

In one embodiment, any of Features 1 through 47 may be excluded.

2. Specific Example Embodiment

A specific example embodiment will be described below. This specific example embodiment provides a reciprocating tool 1 shown in FIG. 1.

The terms "up," "down," "front," "rear," "left," and "right" in the following description or the drawings are used only to facilitate easy understanding of the structure of the reciprocating tool 1 and are not intended to limit the orientation of the reciprocating tool 1. The reciprocating tool 1 can be oriented in any direction.

2-1. Overall Structure of Reciprocating Tool

As shown in FIG. 1, the reciprocating tool 1 in the present embodiment is an electric nailer configured to drive a nail into a workpiece. Examples of the nail used in the reciprocating tool 1 include a staple, a pin nail, a finish nail, and a brad nail. In another embodiment, the reciprocating tool 1 may be any other type of reciprocating tool, such as an electric rebar tier, an electric rebar cutter, an electric lubricator, and an electric inflator.

The reciprocating tool 1 includes a housing 2. The housing 2 includes a driving assembly housing 3 extending from a rear end to a front end of the housing 2 (in other words, in a direction in which a nail is ejected). The reciprocating tool 1 includes an ejector 4 in front of the driving assembly housing 3. The ejector 4 includes a guide 5 configured to guide a nail ejected from the reciprocating tool 1 to a workpiece. In the present embodiment, the guide 5 protrudes from inside the driving assembly housing 3 to the front of the reciprocating tool 1. The ejector 4 includes a pressing member (or a contact) 6 configured to be pressed against a workpiece. The pressing member 6 is disposed above the guide 5, and protrudes most forward in the reciprocating tool 1. The ejector 4 includes a link mechanism 7 coupled to the pressing member 6.

The housing 2 includes a grip 8 extending downward from approximately a center of the driving assembly housing 3. The grip 8 is configured to be held in one hand of a user of the reciprocating tool 1. The grip 8 includes a trigger 9 on its upper front side. The trigger 9 is configured to be pulled by the user's finger (for example, index finger).

The housing 2 includes a motor housing 10 extending downward from a front part of the driving assembly housing 3. The housing 2 includes a battery attachment portion 11 extending from a lower end of the motor housing 10 to a lower end of the grip 8. The battery attachment portion 11 is configured to detachably attach a battery pack 12 to the battery attachment portion 11.

The reciprocating tool 1 includes a magazine 13 extending from a lower part of the guide 5 to a lowest end of the reciprocating tool 1 on a left side of the housing 2. The magazine 13 is configured to deliver one or more nails contained therein into the guide 5 one by one. In the present embodiment, the magazine 13 extends diagonally rearward.

Figure 2:
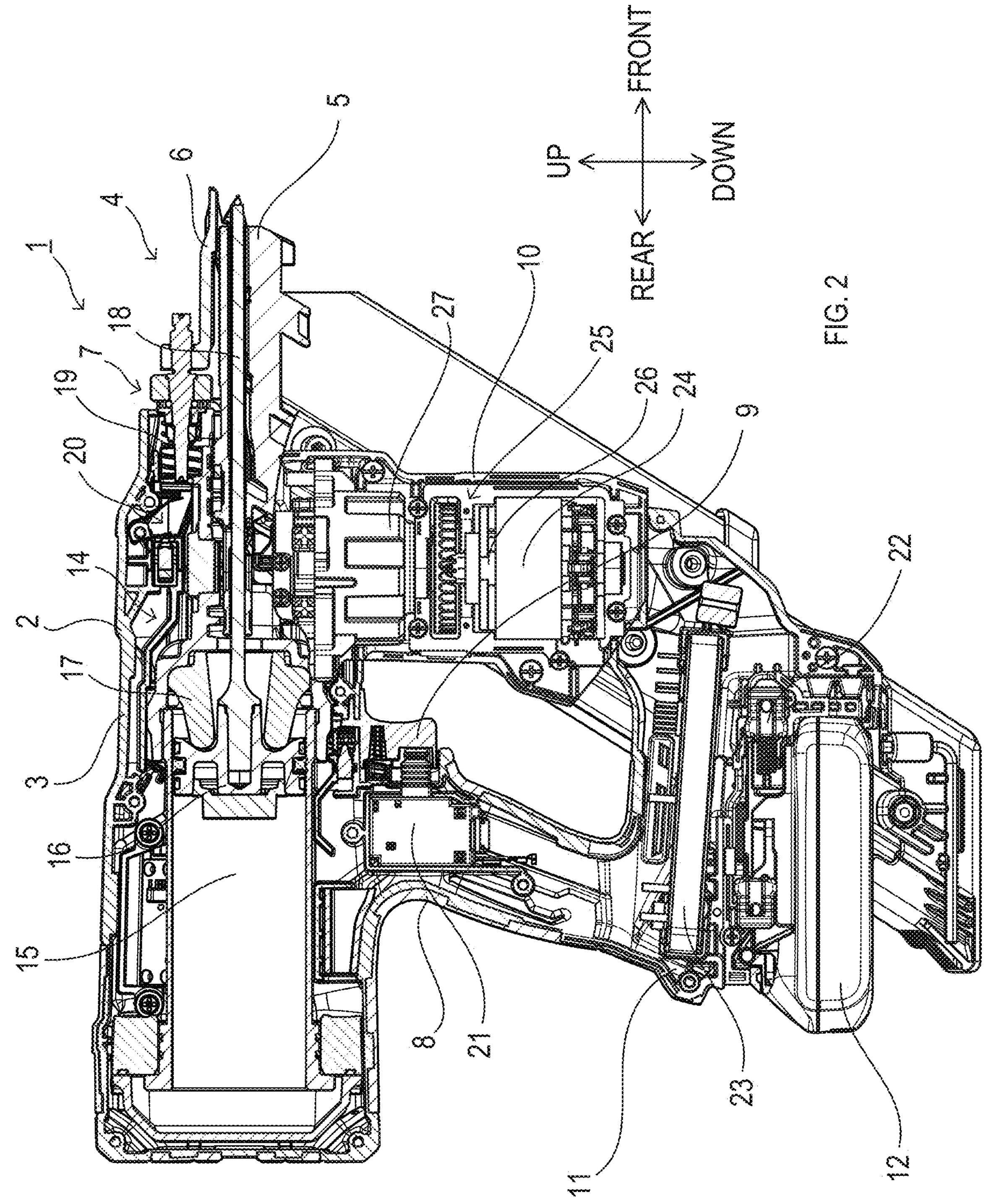
FIG. 2 is a central longitudinal cross-sectional view of the reciprocating tool.

As shown in FIG. 2, the driving assembly housing 3 accommodates a driving assembly 14 configured to drive a nail.

The driving assembly 14 includes a cylinder 15 extending from a rear end of the driving assembly housing 3 to approximately the center thereof. The cylinder 15 contains compressed gas therein. In the present embodiment, the compressed gas is compressed dry air. In another embodiment, the compressed gas may be compressed inert gas, such as compressed nitrogen gas and compressed noble gas.

The cylinder 15 includes a piston 16 therein. The piston 16 is configured to move between rear and front ends of the cylinder 15 while sealing the cylinder 15. The driving assembly 14 includes a bumper 17 at the front end of the cylinder 15. The bumper 17 is configured to receive and stop the piston 16 when the piston 16 reaches the front end of the cylinder 15.

The driving assembly 14 includes a reciprocating member (or a driver) 18 passing through the bumper 17 and coupled to the piston 16. The reciprocating member 18 extends from the piston 16 toward a tip end of the guide 5. The reciprocating member 18 is configured to move toward the tip end of the guide 5 by a pressure applied to the piston 16 from the compressed gas. In other words, the piston 16 urges the reciprocating member 18 toward the tip end of the guide 5 by the compressed gas. In the present embodiment, the reciprocating member 18 has a length such that (i) a tip end of the reciprocating member 18 reaches the tip end of the guide 5 when the piston 16 reaches the front end of the cylinder 15 (in other words, bottom dead center of the piston 16), and (ii) the tip end of the reciprocating member 18 retreats (or retracts) into the driving assembly housing 3 when the piston 16 reaches the rear end of the cylinder 15 (in other words, top dead center of the piston 16).

The link mechanism 7 of the ejector 4 includes a spring 19 inside the driving assembly housing 3. The link mechanism 7 is configured to move the pressing member 6 rearward of the reciprocating tool 1 in response to a tip end of the pressing member 6 being pressed against a workpiece, while urging the pressing member 6 forward by the spring 19.

The driving assembly housing 3 accommodates a contact switch 20 above the reciprocating member 18. The contact switch 20 is configured to be pressed (in other words, turned ON) by the link mechanism 7 when the pressing member 6 is pressed against a workpiece.

The grip 8 accommodates a trigger switch 21. The trigger switch 21 is configured to be pressed (in other words, turned ON) when the trigger 9 is pulled. The trigger switch 21 is configured to be turned OFF when the user's finger is released from the trigger 9.

The battery attachment portion 11 accommodates a connector 22 configured to be detachably coupled to the battery pack 12 attached to the battery attachment portion 11. The battery attachment portion 11 accommodates a controller 23 above the connector 22.

The motor housing 10 accommodates an electric motor 24 in its lower part. In the present embodiment, the electric motor 24 is a three-phase brushless DC motor. In another embodiment, the electric motor 24 may be a single-phase brushless DC motor, a two-phase brushless DC motor, a four-phase or more brushless DC motor, a brushed DC motor, an AC motor, or a stepper motor.

The motor housing 10 accommodates a transmission device 25 above the electric motor 24. The transmission device 25 is coupled to a rotor 26 of the electric motor 24, and is configured to transmit a driving force of the electric motor 24 to the reciprocating member 18.

More specifically, the transmission device 25 includes a reducer 27 (*i*) having a preset deceleration ratio, and (ii) configured to convert the driving force of the electric motor 24 into a decelerated output and transmit the decelerated output to the reciprocating member 18. Accordingly, the transmission device 25 can transmit, to the reciprocating member 18, a torque proportional to the deceleration ratio of the reducer 27. In the present embodiment, the reducer 27 is a concentric gear reducer, more specifically, a planetary gear reducer. In another embodiment, the reducer 27 may be a parallel gear reducer or an orthogonal gear reducer, depending on the structure of the transmission device 25.

Figure 3B:
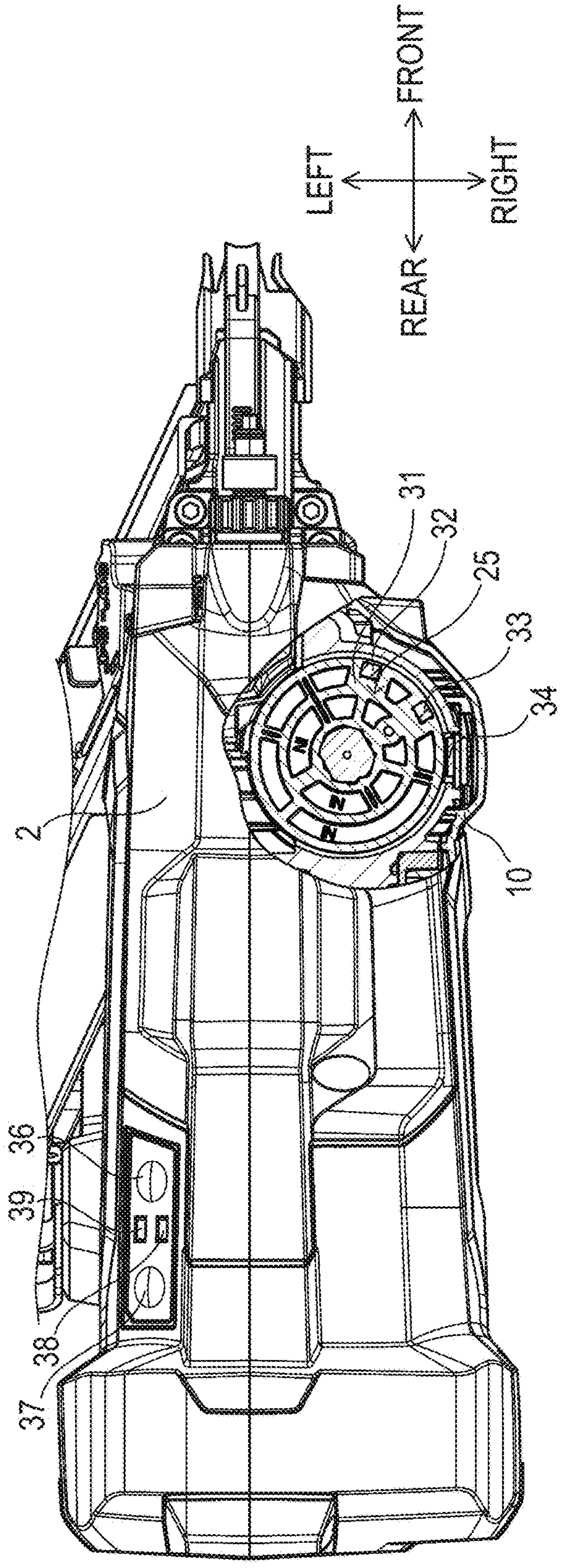
FIG. 3B is a top view of the reciprocating tool including a perspective view of a motor housing.
Figure 3A:
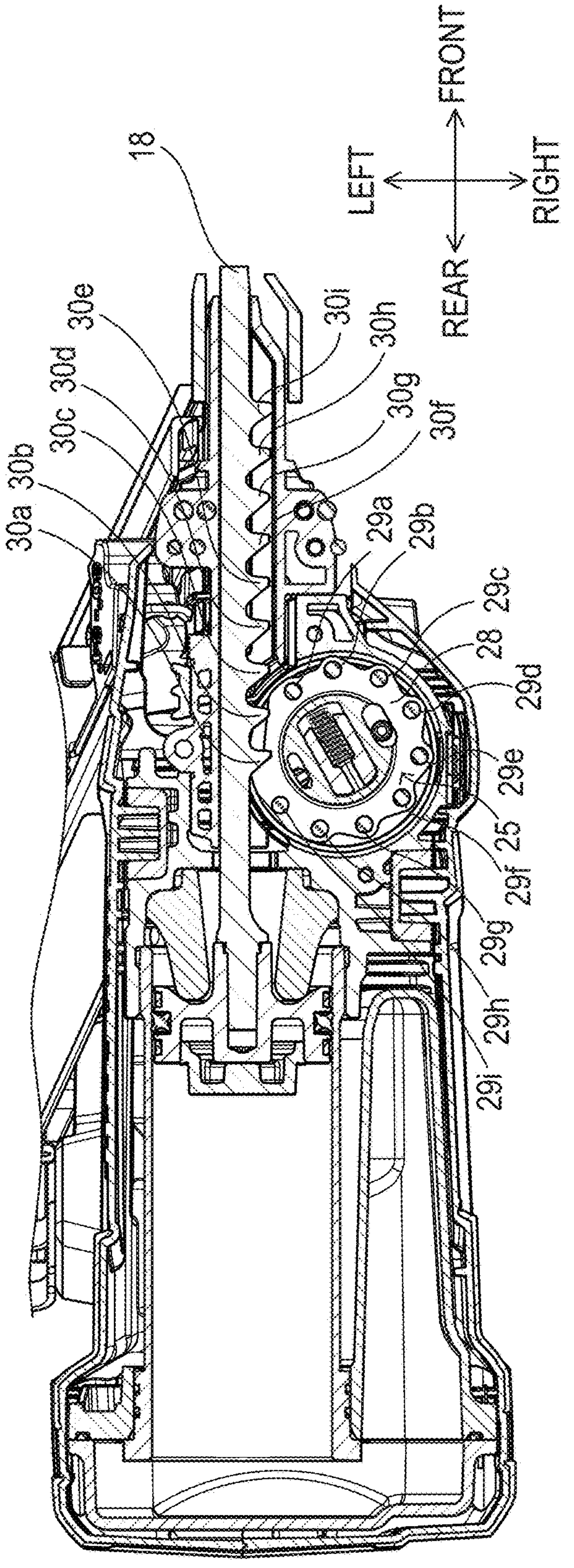
FIG. 3A is a cross-sectional view of the reciprocating tool taken by a line IIIA-IIIA in FIG. 1.

As shown in FIG. 3A, the transmission device 25 includes a cam 28 above the reducer 27. In the present embodiment, the cam 28 is disc-shaped. The cam 28 includes first through ninth pins 29*a* through 29*i* on its outer circumferential edge along its circumferential direction. The cam 28 is configured to rotate by receiving the output of the reducer 27. More specifically, the cam 28 rotates counterclockwise around the rotor 26 of the electric motor 24 when viewed from above the reciprocating tool 1.

The reciprocating member 18 includes first through ninth racks 30*a* through 30*i* on its right side. The first through ninth racks 30*a* through 30*i* are aligned in an extending direction of the reciprocating member 18. The first through ninth racks 30*a* through 30*i* correspond to the first through ninth pins 29*a* through 29*i*, respectively. The first through ninth pins 29*a* through 29*i* engage with the first through ninth racks 30*a* through 30*i*, respectively, to thereby transmit the driving force of the electric motor 24 to the reciprocating member 18.

As shown in FIG. 3B, the transmission device 25 includes a holder 31 above the cam 28. In the present embodiment, the holder 31 is disc-shaped. The holder 31 is a non-magnetic member. The holder 31 includes a first magnet 32 on its top surface. In the present embodiment, the first magnet 32 is disposed on the top surface of the holder 31 such that its south pole faces outward in a radial direction of the holder 31. In another embodiment, the first magnet 32 may be disposed on the top surface of the holder 31 such that its north pole faces outward in the radial direction of the holder 31.

The holder 31 includes a second magnet 33 on its top surface. In the present embodiment, the second magnet 33 is disposed on the top surface of the holder 31 such that its north pole faces outward in the radial direction of the holder 31. In another embodiment, the second magnet 33 may be disposed on the top surface of the holder 31 such that its south pole faces outward in the radial direction of the holder 31.

The holder 31 is configured to rotate by receiving the output of the reducer 27. More specifically, the holder 31, together with the cam 28, rotates counterclockwise around the rotor 26 of the electric motor 24 when viewed from above the reciprocating tool 1.

The motor housing 10 includes a Hall effect IC 34 on its right inner wall. The Hall effect IC 34 faces an outer circumferential edge of the holder 31. The Hall effect IC 34 is configured (i) to detect the south pole of the first magnet 32 when the first magnet 32 comes close to the Hall effect IC 34, and (ii) to detect the north pole of the second magnet 33 when the second magnet 33 comes close to the Hall effect IC 34.

The housing 2 includes, on a left side of its upper rear part, a main power switch 36 configured to be pressed by the user to turn the power of the reciprocating tool 1 ON or OFF.

The housing 2 includes a mode selection switch 37 adjacent to the main power switch 36. The mode selection switch 37 is configured to be pressed by the user to select operation modes of the reciprocating tool 1.

The housing 2 includes a first indicator 38 between the main power switch 36 and the mode selection switch 37. The first indicator 38 is turned ON (i) when the reciprocating tool 1 is set to a later-described single shot mode, or (ii) when malfunction occurs in the reciprocating tool 1.

The housing 2 includes a second indicator 39 adjacent to the first indicator 38. The second indicator 39 is turned ON (i) when the reciprocating tool 1 is set to a later-described multiple shot mode, or (ii) when malfunction occurs in the reciprocating tool 1.

2-2. Mechanical Operation of Reciprocating Tool 2-2-1. Mechanical Operations of Reciprocating Member and Cam Referring to FIGS. 4A through 4D, operations of the reciprocating member 18 and the cam 28 will be described. In many cases, the user uses the reciprocating tool 1 with a front end of the reciprocating tool 1 facing downward, when machining a workpiece. Thus, in FIGS. 4A through 4D, the front end of the reciprocating tool 1 faces downward.

Figure 4D:
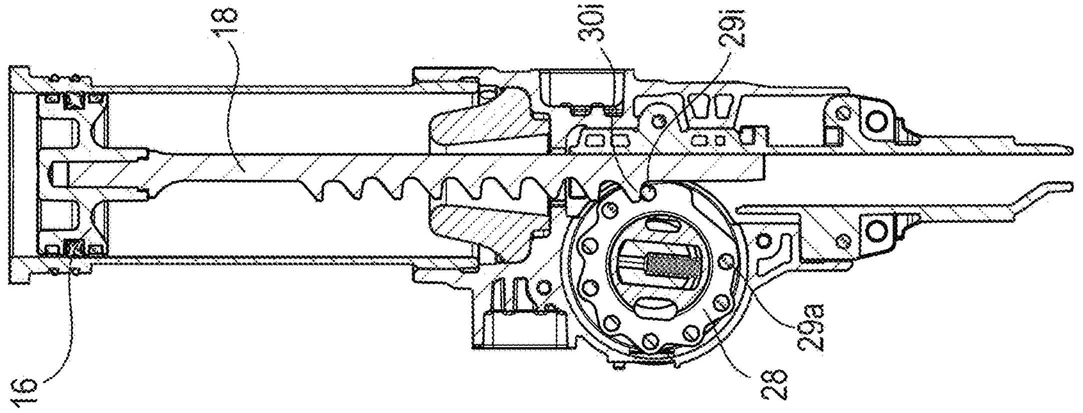
FIGS. 4A through 4D show one sequence of mechanical operations in the reciprocating tool.
Figure 4C:
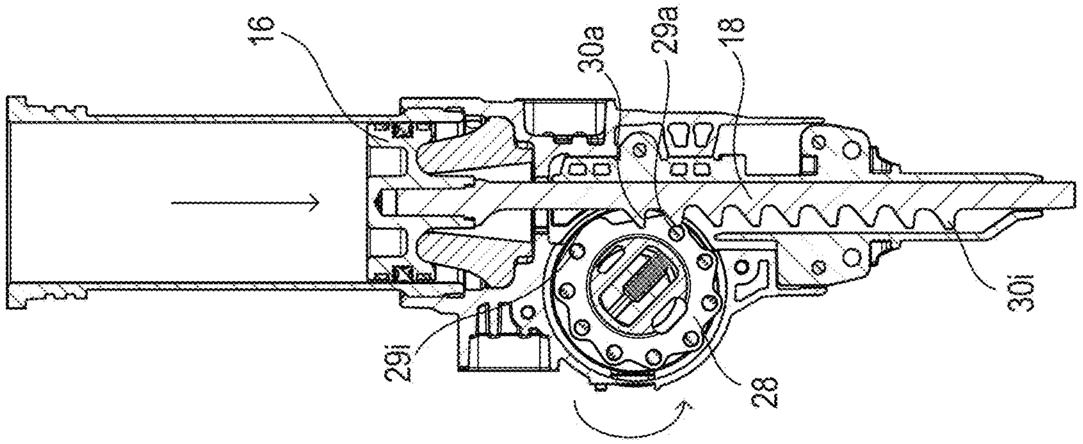
Figure 4B:
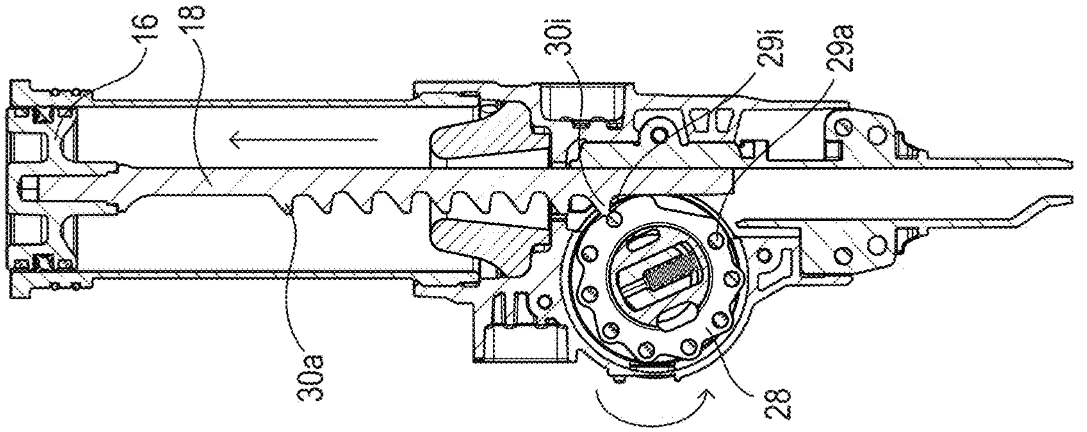
Figure 4A:
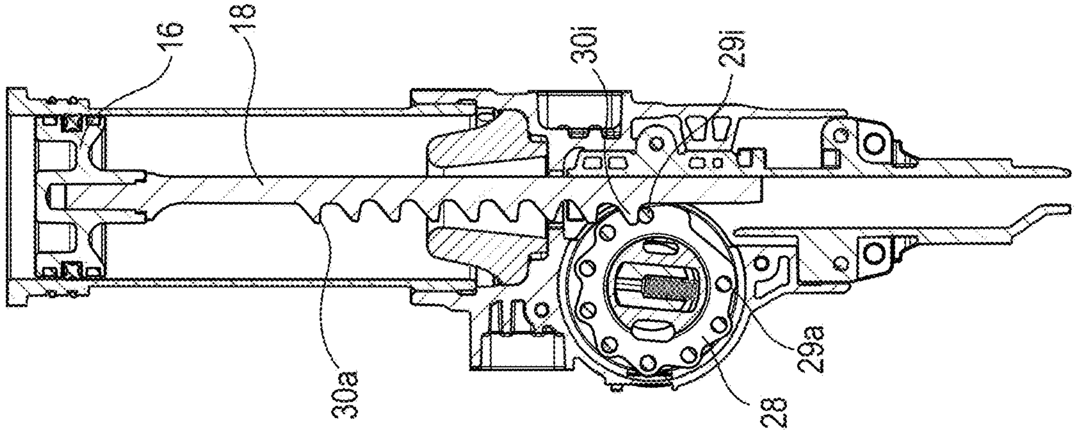

As shown in FIG. 4A, the reciprocating member 18 is normally held in a standby position. The standby position is set immediately before top dead center of the reciprocating member 18. In the present embodiment, the standby position is a position to stop the reciprocating member 18 as well as a position where the reciprocating member 18 waits for the next reciprocating motion of the reciprocating member 18. In the standby position, the first through eighth pins 29*a* through 29*h* of the cam 28 are disengaged from the first through eighth racks 30*a* through 30*h* of the reciprocating member 18, and only the ninth pin 29*i* of the cam 28 is engaged with the ninth rack 30*i* of the reciprocating member 18. At this point in time, the piston 16 is located immediately before its top dead center.

When the electric motor 24 is driven and the cam 28 rotates counterclockwise, the reciprocating member 18 is driven from the standby position to its top dead center, as shown in FIG. 4B. At this point in time, the piston 16 also reaches its top dead center.

When the reciprocating member 18 reaches its top dead center and the ninth pin 29*i* is disengaged from the ninth rack 30*i*, the reciprocating member 18 is driven to its bottom dead center by the pressure of the compressed gas applied from the piston 16, as shown in FIG. 4C. Consequently, a nail delivered into the guide 5 is struck by the reciprocating member 18 and driven into a workpiece. When the reciprocating member 18 reaches its bottom dead center, the piston 16 also reaches its bottom dead center. The cam 28 continues to rotate after the ninth pin 29*i* is disengaged from the ninth rack 30*i*, and the first through ninth pins 29*a* through 29*i* again engage with the first through ninth racks 30*a* through 30*i*, respectively. Then, as shown in FIG. 4D, the reciprocating member 18 returns to the standby position, and the cam 28 is stopped.

2-2-2. Mechanical Operation of Holder

Figure 5A:
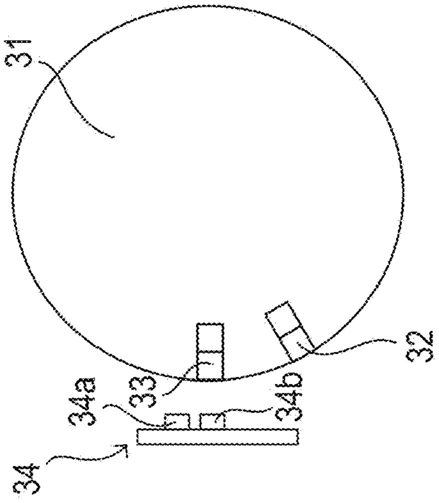
FIGS. 5A through 5E show operations of a holder corresponding to the one sequence of mechanical operations in the reciprocating tool.
Figure 5B:
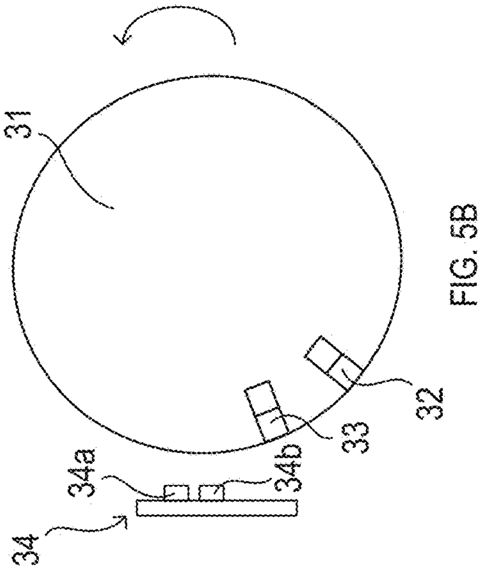
Figure 5C:
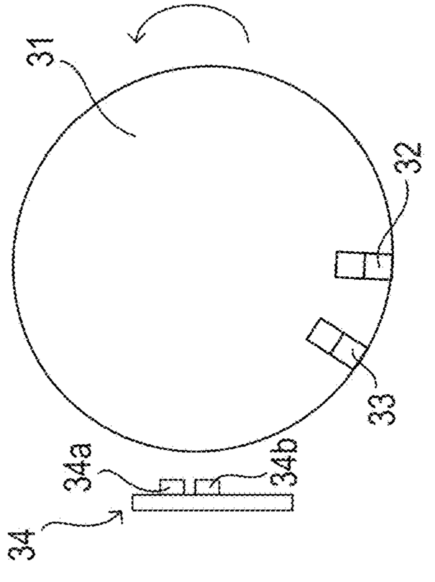
Figure 5D:
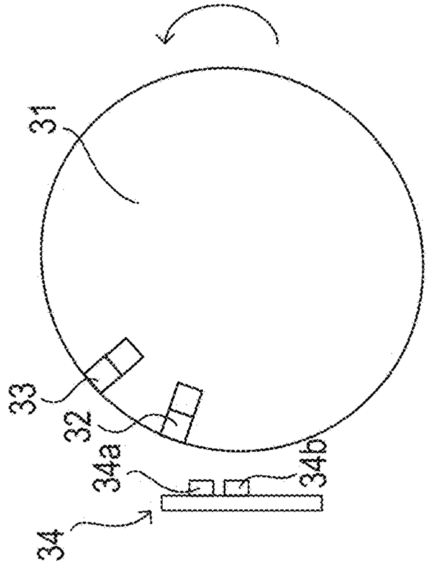

When the electric motor 24 is driven, the holder 31, together with the cam 28, rotates as shown in FIGS. 5A through 5E. FIGS. 5A through 5C and 5E respectively correspond to FIGS. 4A through 4D. FIG. 5D shows a rotational position of the holder 31 when the cam 28 is positioned between (i) the rotational position of the cam 28 shown in FIG. 4C, and (ii) the rotational position of the cam 28 shown in FIG. 4D.

The Hall effect IC 34 includes a first Hall element 34*a*. In the present embodiment, the first Hall element 34*a* is configured to detect the south pole of the first magnet 32. In another embodiment, when the first magnet 32 is disposed on the top surface of the holder 31 such that its north pole faces outward in the radial direction of the holder 31, the first Hall element 34*a* may be configured to detect the north pole of the first magnet 32.

The Hall effect IC 34 includes a second Hall element 34*b*. In the present embodiment, the second Hall element 34*b* is configured to detect the north pole of the second magnet 33. In another embodiment, when the second magnet 33 is disposed on the top surface of the holder 31 such that its south pole faces outward in the radial direction of the holder 31, the second Hall element 34*b* may be configured to detect the south pole of the second magnet 33.

The first magnet 32 is disposed before the second magnet 33 in the rotational direction of the holder 31 (i.e., the counterclockwise direction in FIGS. 5A through 5E).

More specifically, as shown in FIG. 5D, the first magnet 32 is disposed on the top surface of the holder 31 such that its south pole faces the first Hall element 34*a* at the timing to start preparing to stop the cam 28.

Figure 5E:
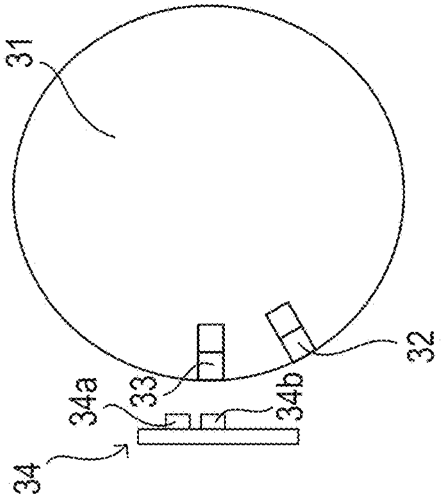

As shown in FIGS. 5A and 5E, the second magnet 33 is disposed on the top surface of the holder 31 such that its north pole faces the second Hall element 34b when the reciprocating member 18 is in the standby position.

2-3. Electrical Configuration of Reciprocating Tool

Figure 6:
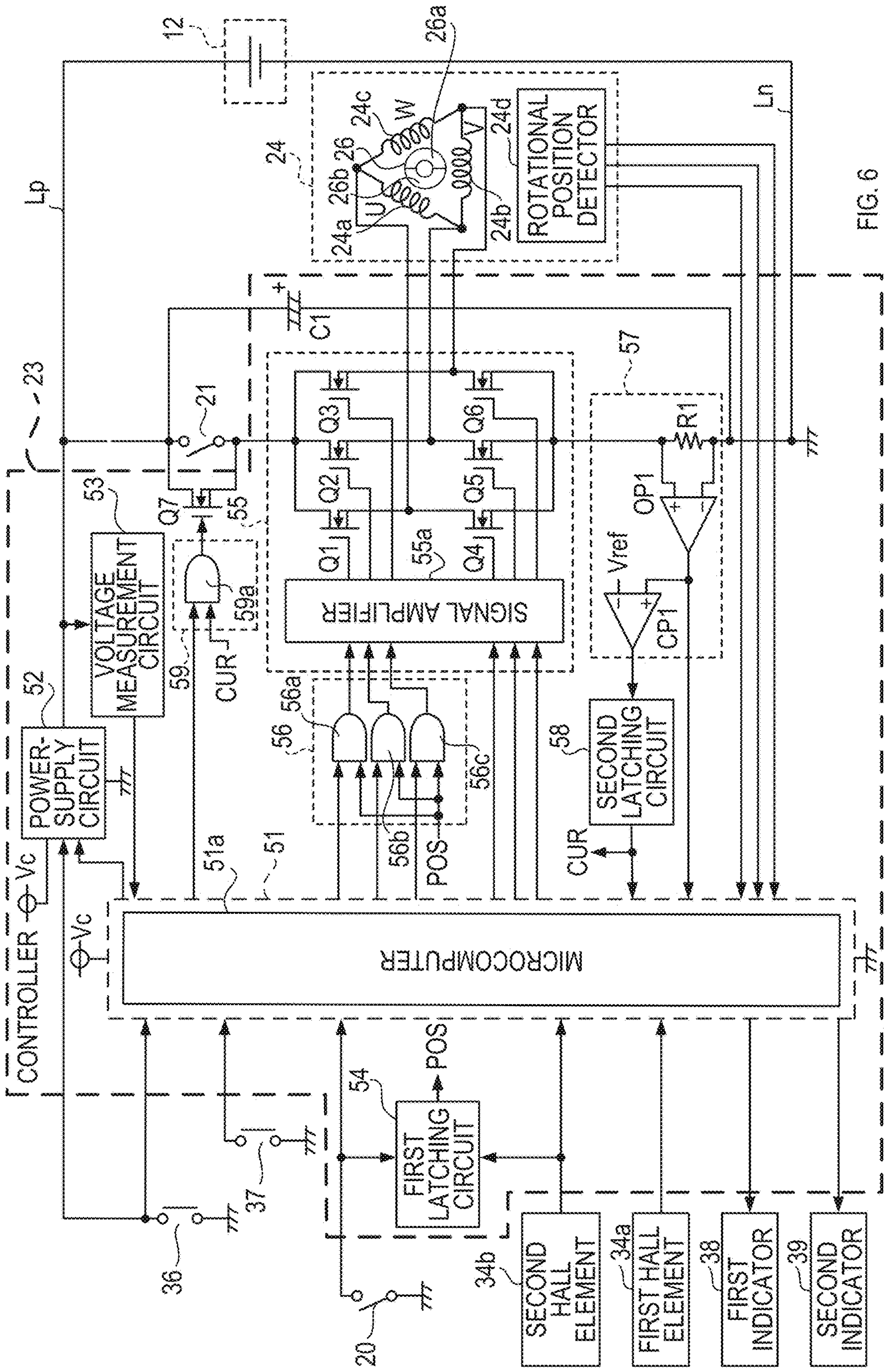
FIG. 6 is a circuit diagram showing an electrical configuration of the reciprocating tool.

As shown in FIG. 6, the electric motor 24 includes first through third coils 24a through 24c respectively associated with three phases (that is, U-PHASE, V-PHASE, and W-PHASE) of the electric motor 24. The first through third coils 24a through 24c are configured to be sequentially excited so as to generate a rotating magnetic field. In the present embodiment, the first through third coils 24a through 24c form a delta connection. In another embodiment, the first through third coils 24a through 24c may form a star connection (or a wye connection). The rotor 26 (i) includes a first pole 26a and a second pole 26b, and (ii) is configured to rotate when the first pole 26a and the second pole 26b are subjected to the rotating magnetic field generated by the first through third coils 24a through 24c.

The electric motor 24 includes a rotational position detector 24d. The rotational position detector 24d is configured to output first through third pulse signals (or square wave signals) to the controller 23 in accordance with a rotational position of the rotor 26. In the present embodiment, the rotational position detector 24d is a Hall effect sensor. In the present embodiment, each of the first through third pulse signals reverses from positive (or HIGH) to negative (or LOW) or from negative (or LOW) to positive (or HIGH) each time the rotor 26 rotates by 180 electrical degrees. The first through third pulse signals have a phase difference of 60 electrical degrees from each other. In another embodiment, the rotational position detector 24d may be configured to output one pulse signal, instead of the first through third pulse signals, to the controller 23 each time the rotor 26 rotates by 60 electrical degrees. In yet another embodiment, the rotational position detector 24d may be configured to output first through third sine wave signals, instead of the first through third pulse signals, to the controller 23. In this case, the controller 23 may include a waveform conversion circuit configured to convert the first through third sine wave signals into first through third pulse signals. In yet another embodiment, the rotational position detector 24d may be a pulse encoder.

The reciprocating tool 1 includes a power line Lp extending from a positive electrode of the battery pack 12 attached to the battery attachment portion 11 to the controller 23. The reciprocating tool 1 includes a ground line Ln extending from a negative electrode of the battery pack 12 attached to the battery attachment portion 11 to the controller 23. The ground line Ln is coupled to a ground of the reciprocating tool 1 on the controller 23. The battery pack 12 applies its output voltage (hereinafter, referred to as "battery voltage") between the power line Lp and the ground line Ln.

The controller 23 includes a control circuit 51. In the present embodiment, the control circuit 51 includes a microcomputer 51a. The microcomputer 51a includes a CPU (not shown), a ROM (not shown), a RAM (not shown), an analog-to-digital (A-to-D) converter (not shown), input ports (not shown), and output ports (not shown). In another embodiment, the control circuit 51 may include an additional microcomputer. In yet another embodiment, the control circuit 51 may include a logic circuit (or a wired logic connection) including two or more electronic components, in addition to or in place of the microcomputer 51a. In yet another embodiment, the control circuit 51 may include an ASIC and/or an ASSP, in addition to or in place of the microcomputer 51a. In yet another embodiment, the control circuit 51 may include a PLD on which a reconfigurable logic circuit can be implemented, in addition to or in place of the microcomputer 51a. Examples of the PLD include an FPGA.

The control circuit 51 is coupled to the rotational position detector 24d. The control circuit 51 is configured (i) to receive the first through third pulse signals from the rotational position detector 24d, and (ii) to detect the rotational position of the rotor 26 based on the first through third pulse signals received.

The control circuit 51 is coupled to the main power switch 36. The main power switch 36 includes (i) a first contact coupled to the ground of the reciprocating tool 1 and (ii) a second contact coupled to the control circuit 51. Accordingly, the main power switch 36 is configured to output a first negative logic signal to the control circuit 51 in response to the main power switch 36 being pressed (in other words, turned ON). The control circuit 51 is configured to detect that the main power switch 36 is ON based on the control circuit 51 receiving the first negative logic signal from the main power switch 36.

The control circuit 51 is coupled to the mode selection switch 37. The mode selection switch 37 includes (i) a first contact coupled to the ground of the reciprocating tool 1 and (ii) a second contact coupled to the control circuit 51. Accordingly, the mode selection switch 37 is configured to output a second negative logic signal to the control circuit 51 in response to the mode selection switch 37 being pressed (in other words, turned ON). The control circuit 51 is configured to detect that the mode selection switch 37 is ON based on the control circuit 51 receiving the second negative logic signal from the mode selection switch 37.

The control circuit 51 is coupled to the contact switch 20. The contact switch 20 includes (i) a first contact coupled to the ground of the reciprocating tool 1 and (ii) a second contact coupled to the control circuit 51. Accordingly, the contact switch 20 is configured to output a third negative logic signal to the control circuit 51 in response to the contact switch 20 being pressed (in other words, turned ON) by the pressing member 6 being pressed against a workpiece. The control circuit 51 is configured to detect that the contact switch 20 is ON based on the control circuit 51 receiving the third negative logic signal from the contact switch 20.

The control circuit 51 is coupled to the first Hall element 34a. The first Hall element 34a is configured to output a first position detection signal to the control circuit 51 in response to the first Hall element 34a detecting the south pole of the first magnet 32. In the present embodiment, the first position detection signal is a negative logic signal. In another embodiment, the first position detection signal may be a positive logic signal.

The control circuit 51 is coupled to the second Hall element 34b. The second Hall element 34b is configured to output a second position detection signal to the control circuit 51 in response to the second Hall element 34b detecting the north pole of the second magnet 33 . . . . In the present embodiment, the second position detection signal is a negative logic signal. In another embodiment, the second position detection signal may be a positive logic signal.

The control circuit 51 is (i) coupled to the first indicator 38, and (ii) configured to output a first lighting signal to the first indicator 38. The first indicator 38 is configured to be turned ON when receiving the first lighting signal from the control circuit 51.

The control circuit 51 is (i) coupled to the second indicator 39, and (ii) configured to output a second lighting signal to the second indicator 39. The second indicator 39 is configured to be turned ON when receiving the second lighting signal from the control circuit 51.

The controller 23 includes a power-supply circuit 52 coupled to (i) the first contact of the main power switch 36, (ii) the control circuit 51, (iii) the power line Lp, and (iv) the ground. The main power switch 36 is configured to output the first negative logic signal to the power-supply circuit 52, in addition to the control circuit 51. The control circuit 51 is configured to output a remote control (RC) signal to the power-supply circuit 52. In the present embodiment, the RC signal is a negative logic signal. In another embodiment, the RC signal may be a positive logic signal.

The power-supply circuit 52 is configured to maintain its ON-state (i) while receiving the first negative logic signal from the main power switch 36, or (ii) while receiving the RC signal from the control circuit 51. The power-supply circuit 52 is configured to generate, in its ON-state, a fixed direct voltage (hereinafter, referred to as "power-supply voltage") Vc based on the battery voltage. The power-supply voltage Vc generated by the power-supply circuit 52 is delivered to the rotational position detector 24*d*, the first Hall element 34*a*, the second Hall element 34*b*, the first indicator 38, the second indicator 39, and various circuits on the controller 23, via not shown paths.

The controller 23 includes a voltage measurement circuit 53 configured (i) to measure the battery voltage on the power line Lp, and (ii) to output a battery voltage signal to the control circuit 51. The battery voltage signal is an analog signal having a voltage corresponding to the measured battery voltage.

The controller 23 includes a first latching circuit 54 coupled to (i) the first contact of the contact switch 20 and (ii) the second Hall element 34*b*. The first latching circuit 54 is configured (i) to hold its output (POS) negative (or LOW) in response to a falling edge (or a negative edge) of the second position detection signal output from the second Hall element 34*b*, and (ii) to reset its output to positive (or HIGH) in response to the third negative logic signal output from the contact switch 20.

The controller 23 includes a drive circuit 55 coupled to the control circuit 51. The control circuit 51 is configured to output first through sixth pulse-width modulated (PWM) signals to the drive circuit 55. The first through sixth PWM signals share the same cycle. The drive circuit 55 is configured to drive the electric motor 24 in accordance with the first through sixth PWM signals received from the control circuit 51.

More specifically, the drive circuit 55 includes a signal amplifier (or a level shifter) 55*a* configured to amplify the first through sixth PWM signals received from the control circuit 51.

The drive circuit 55 includes first through sixth switches Q1 through Q6 that form a three-phase full-bridge circuit. The first through third switches Q1 through Q3 are coupled to (i) the power line Lp and (ii) the first through third coils 24*a* through 24*c* so as to serve as high-side switches of the three-phase full-bridge circuit. The fourth through sixth switches Q4 through Q6 are coupled to (i) the first through third coils 24*a* through 24*c* and (ii) the ground so as to serve as low-side switches of the three-phase full-bridge circuit.

The first through sixth switches Q1 through Q6 are configured to respectively receive the first through sixth PWM signals amplified by the signal amplifier 55*a*, and to transition into their respective ON-states or OFF-states. In the present embodiment, the first through sixth switches Q1 through Q6 are n-channel metal-oxide semiconductor field-effect transistors (MOSFETs). In another embodiment, at least one of the first through sixth switches Q1 through Q6 may be other types of semiconductor switches including a junction field-effect transistor (JFET), a bipolar transistor, and an insulated gate bipolar transistor (IGBT). In yet another embodiment, each or at least one of the first through sixth switches Q1 through Q6 may be a mechanical relay.

The controller 23 includes a first signal cutoff circuit 56 configured to cut off the first through third PWM signals output from the control circuit 51. More specifically, the first signal cutoff circuit 56 is configured (i) to be disabled while the output (POS) of the first latching circuit 54 is positive, and (ii) to be enabled while the output of the first latching circuit 54 is negative. When the first signal cutoff circuit 56 is disabled, the first through third PWM signals are delivered to the drive circuit 55 via the first signal cutoff circuit 56. When the first signal cutoff circuit 56 is enabled, the first through third PWM signals are cut off from the drive circuit 55 by the first signal cutoff circuit 56.

In the present embodiment, the first signal cutoff circuit 56 includes wired logic. More specifically, the first signal cutoff circuit 56 includes first through third AND gates 56*a* through 56*c*. The first through third AND gates 56*a* through 56*c* are configured (i) to deliver the first through third PWM signals to the drive circuit 55 while the output of the first latching circuit 54 is positive, and (ii) to cut off the drive circuit 55 from the first through third PWM signals (or to cut off the first through third PWM signals to the drive circuit 55) by setting their respective outputs to negative (or LOW) while the output of the first latching circuit 54 is negative.

The controller 23 includes a current measurement circuit 57 (*i*) intercoupling (or interconnecting) between the drive circuit 55 and the ground, and (ii) configured to measure a magnitude of an electric current flowing through the electric motor 24 (hereinafter, referred to as "motor current"). The current measurement circuit 57 includes a shunt resistor R1. The shunt resistor R1 includes (i) a first end coupled to the fourth through sixth switches Q4 through Q6 and (ii) a second end coupled to the ground.

The current measurement circuit 57 includes a differential amplifier OP1 configured (i) to measure the magnitude of the motor current flowing through the shunt resistor R1, and (ii) to output a current measurement signal. More specifically, the differential amplifier OP1 is configured to amplify a voltage across the shunt resistor R1 to thereby generate the current measurement signal. Accordingly, the current measurement signal is an analog signal having a voltage corresponding to the magnitude of the motor current. The differential amplifier OP1 may be an open-loop configuration with no negative feedback circuit from its output to its input, or may be a closed-loop configuration with such a negative feedback circuit. The control circuit 51 is configured to receive the current measurement signal.

The current measurement circuit 57 includes a comparator CP1 configured to detect that the trigger switch 21 is ON. More specifically, the comparator CP1 is configured (i) to compare the voltage of the current measurement signal with a preset reference voltage Vref, (ii) to set its output to positive (or HIGH) in response to the voltage of the current measurement signal being greater than the reference voltage Vref, and (iii) to set its output to negative (or LOW) in response to the voltage of the current measurement signal being smaller than or equal to the reference voltage Vref. The reference voltage Vref is equal to or approximate to the voltage of the current measurement signal when an insufficient motor current to be describe later is flowing through the electric motor 24.

The controller 23 includes a second latching circuit 58 configured to hold its output (CUR) positive (or HIGH) in response to the output of the comparator CP1 being positive. The second latching circuit 58 is configured to hold its output positive for at least a period of time (for example, 100 milliseconds) equal to or longer than the cycle of the first through sixth PWM signals, each time the output of the comparator CP1 transitions from negative to positive. The control circuit 51 is configured to receive the output of the second latching circuit 58.

The trigger switch 21 intercouples (or interconnects) between (i) the power line Lp and (ii) the first through third switches Q1 through Q3. More specifically, the trigger switch 21 includes (i) a first contact coupled to the power line Lp, and (ii) a second contact coupled to the first through third switches Q1 through Q3, and is configured to establish or cut off coupling (or connection) between the power line Lp and the first through third switches Q1 through Q3.

The controller 23 includes a seventh switch Q7 coupled to (i) the first contact and (ii) the second contact of the trigger switch 21. The seventh switch Q7 is configured (i) to establish coupling (or connection) between the first contact and the second contact of the trigger switch 21 when in its ON-state, and (ii) to cut off the coupling (or the connection) between the first contact and the second contact of the trigger switch 21 when in its OFF-state. Accordingly, the seventh switch Q7 is configured (i) to couple the power line Lp with the first through third switches Q1 through Q3 via the seventh switch Q7 while the trigger switch 21 is in its OFF-state and the seventh switch Q7 is in its ON-state, and (ii) to uncouple the power line Lp from the first through third switches Q1 through Q3 while the trigger switch 21 is in its OFF-state and the seventh switch Q7 is also in its OFF-state. In the present embodiment, the seventh switch Q7 is an n-channel MOSFET. In another embodiment, the seventh switch Q7 may be other types of semiconductor switches including a JFET, a bipolar transistor, an IGBT, and a solid state relay (SSR). In yet another embodiment, the seventh switch Q7 may be a mechanical relay.

The control circuit 51 is configured to output (i) a switch-ON signal for turning ON the seventh switch Q7, and (ii) a switch-OFF signal for turning OFF the seventh switch Q7. In the present embodiment, the switch-ON signal is a positive logic signal, and the switch-OFF signal is a negative logic signal. In another embodiment, the switch-ON signal may be a negative logic signal, and the switch-OFF signal may be a positive logic signal.

The controller 23 includes a second signal cutoff circuit 59 configured to cut off the switch-ON signal output from the control circuit 51. More specifically, the second signal cutoff circuit 59 is configured (i) to be disabled while the output (CUR) of the second latching circuit 58 is positive, and (ii) to be enabled while the output of the second latching circuit 58 is negative. When the second signal cutoff circuit 59 is disabled, the switch-ON signal is delivered to the seventh switch Q7 via the second signal cutoff circuit 59. When the second signal cutoff circuit 59 is enabled, the switch-ON signal is cut off from the seventh switch Q7 by the second signal cutoff circuit 59.

In the present embodiment, the second signal cutoff circuit 59 includes wired logic. More specifically, the second signal cutoff circuit 59 includes a fourth AND gate 59*a*. The fourth AND gate 59*a* is configured (i) to deliver the switch-ON signal to the seventh switch Q7 while the output of the second latching circuit 58 is positive, and (ii) to cut off the seventh switch Q7 from the switch-ON signal (or to cut off the switch-ON signal to the seventh switch Q7) by setting an output of the fourth AND gate 59*a* to negative (or LOW) while the output of the second latching circuit 58 is negative.

The controller 23 includes an electrolytic capacitor C1 configured to deliver a stable motor current to the electric motor 24. The electrolytic capacitor C1 includes (i) an anode coupled to the first contact of the trigger switch 21, and (ii) a cathode coupled to the ground. In another embodiment, the electrolytic capacitor C1 may be removed.

2-4. Electrical Operation of Reciprocating Tool

The above-described electrical configuration operates as follows.

Figure 7:
FIG. 7 is a timing diagram showing an outline of an electrical operation of the reciprocating tool.

As shown in FIG. 7, when the pressing member 6 is pressed against a workpiece to turn ON the contact switch 20 while the power-supply circuit 52 is in the ON-state, the output (POS) of the first latching circuit 54 is held positive (or HIGH), and the first signal cutoff circuit 56 is disabled. The control circuit 51 detects the rotational position of the rotor 26 based on the first through third pulse signals received from the rotational position detector 24*d* until this point in time. The control circuit 51 selects (i) one of the high-side switches, and (ii) one of the low-side switches according to a first lookup table stored in the ROM, and outputs the PWM signals corresponding to these selected switches. The first lookup table specifies a combination of the high-side and low-side switches to be selected in association with the rotational position of the rotor 26. The first lookup table is set to select a combination of the high-side and low-side switches that fails the rotor 26 to rotate. More specifically, in the present embodiment, the first lookup table is set to select (i) a combination of the high-side and low-side switches that generates a magnetic field that attracts the first pole 26*a* of the rotor 26 to the coil (any of the first through third coils 24*a* through 24*c*) facing the first pole 26*a*, or (ii) a combination of the high-side and low-side switches that generates a magnetic field that attracts the second pole 26*b* of the rotor 26 to the coil (any of the first through third coils 24*a* through 24*c*) facing the second pole 26*b*.

Each of the corresponding PWM signals has an initial duty ratio. The initial duty ratio is greater than zero but insufficient to start the electric motor 24 (for example, 10%). With the initial duty ratio as such, the selected high-side and low-side switches deliver the insufficient motor current to the corresponding one of the first through third coils 24*a* through 24*c*. The rotor 26 is configured not to rotate by the insufficient motor current.

When the trigger switch 21 is ON, and the insufficient motor current flows, the output (CUR) of the second latching circuit 58 is held positive (or HIGH), and the second signal cutoff circuit 59 is disabled. When the control circuit 51 detects that the trigger switch 21 is ON based on the output of the second latching circuit 58 being positive, the switch-ON signal is delivered from the control circuit 51 to the seventh switch Q7 to turn ON the seventh switch Q7. Then, the control circuit 51 performs a soft start. In the soft start, the control circuit 51 selects (i) one of the high-side switches and (ii) one of the low-side switches according to a second lookup table stored in the ROM, and outputs the PWM signals corresponding to these selected switches. The second lookup table specifies a combination of the high-side and low-side switches to be selected in association with the rotational position of the rotor 26. The second lookup table is set to select a combination of the high-side and low-side switches that contributes to rotating the rotor 26. The control circuit 51 gradually increases the duty ratio of each of the corresponding PWM signals while performing the soft start.

When the soft start is completed, the control circuit 51 sets the duty ratios of the PWM signals corresponding to the selected high-side and low-side switches to 100%.

When the first Hall element 34*a* detects that the reciprocating member 18 reaches a stop preparation position, the control circuit 51 starts preparing to stop the electric motor 24. Specifically, the control circuit 51 calculates remaining drive time of the electric motor 24. When the calculated remaining drive time elapses, the control circuit 51 sets the duty ratios of all the first through sixth PWM signals to 0% to bring the electric motor 24 into a free-run state (or coast the electric motor 24).

Next, when the second Hall element 34*b* detects that the reciprocating member 18 reaches the standby position, (i) the output (POS) of the first latching circuit 54 is reset to negative (or LOW), (ii) the first signal cutoff circuit 56 is enabled, and (iii) the first through third PWM signals are cut off from the first through third switches Q1 through Q3 by the first signal cutoff circuit 56. Almost simultaneously, the control circuit 51 outputs the PWM signals each having a specified duty ratio (for example, 100%) to at least two of the fourth through sixth switches Q4 through Q6 so as to generate dynamic braking (or regenerative braking) in the electric motor 24. As a result, the dynamic braking is generated in the electric motor 24, and the electric motor 24 stops.

When the control circuit 51 detects that the electric motor 24 has stopped based on the first through third pulse signals, the switch-OFF signal is delivered from the control circuit 51 to the seventh switch Q7, and the seventh switch Q7 is turned OFF.

2-5. Operation Modes of Reciprocating Tool

As described above, the reciprocating tool 1 is configured to be switched between the single shot mode (or the single firing mode or the sequential firing mode) and the multiple shot mode (or the contact firing mode or the bump firing mode). Operations of the reciprocating tool 1 in the single shot mode and the multiple shot mode are summarized as follows.

In the single shot mode, the reciprocating tool 1 discharges one nail into a workpiece when the trigger 9 is pulled with the pressing member 6 being pressed against the workpiece.

In the single shot mode, the reciprocating tool 1 does not discharge a nail when the pressing member 6 is pressed against a workpiece with the trigger 9 being pulled.

In the multiple shot mode, the reciprocating tool 1 discharges one nail into a workpiece each time the pressing member 6 is pressed against the workpiece with the trigger 9 being pulled.

2-6. Processes Executed by Control Circuit

Processes executed by the control circuit 51 (more specifically, the microcomputer 51*a*) will be described in detail below.

2-6-1. Main Routine

Figure 8:
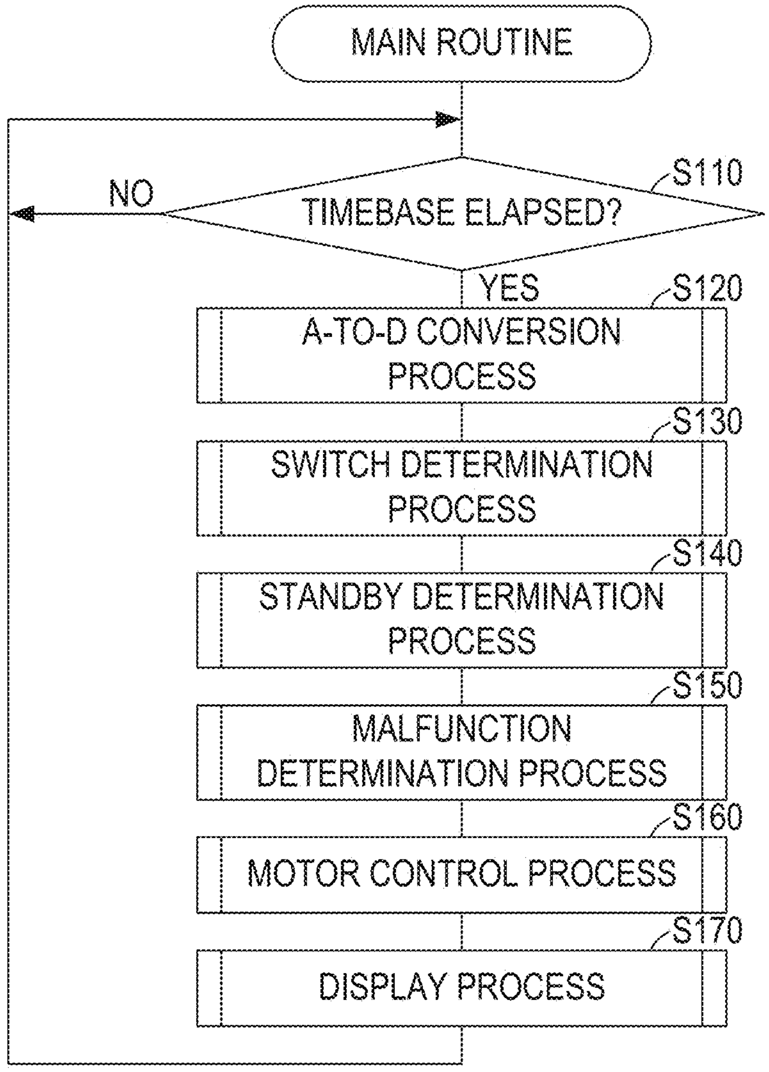
FIG. 8 is a flowchart showing a flow of a main routine executed by a control circuit.

The control circuit 51 repeatedly executes a main routine shown in FIG. 8 during its operation.

As shown in FIG. 8, the control circuit 51 first waits in S110 until a preset timebase elapses (S110: NO). When the timebase elapses (S110: YES), the control circuit 51 proceeds from S120 through S170 sequentially.

In S120, the control circuit 51 executes an A-to-D conversion process. In the A-to-D conversion process, the control circuit 51 converts the battery voltage signal and the current measurement signal into their respective digital values, and stores the digital values in the RAM.

In S130, the control circuit 51 executes a switch determination process. In the switch determination process, the control circuit 51 stores, in the RAM, logic levels of the voltages (i.e., positive or negative, or HIGH or LOW, or 1 or 0) received from the main power switch 36, the mode selection switch 37, the contact switch 20, the first Hall element 34*a*, the second Hall element 34*b*, and the second latching circuit 58.

In S140, the control circuit 51 executes a standby determination process. The standby determination process will be described later in detail.

In S150, the control circuit 51 executes a malfunction determination process. In the malfunction determination process, the control circuit 51 determines whether an error flag is set. The error flag is (i) set when malfunction has occurred, and (ii) cleared when no malfunction has occurred. When the error flag is set, the control circuit 51 performs a predefined operation that corresponds to the malfunction.

In S160, the control circuit 51 executes a motor control process. The motor control process will be described later in detail.

In S170, the control circuit 51 executes a display process. In the display process, the control circuit 51 turns ON the first indicator 38 or the second indicator 39 in accordance with the set operation mode. More specifically, when the reciprocating tool 1 is set to the single shot mode, the control circuit 51 outputs the first lighting signal to the first indicator 38. When the reciprocating tool 1 is set to the multiple shot mode, the control circuit 51 outputs the second lighting signal to the second indicator 39. In addition, when the error flag is set, the control circuit 51 outputs the first lighting signal and the second lighting signal to the first indicator 38 and the second indicator 39, respectively.

2-6-2. Interrupting Process

The control circuit 51, in addition to the above-described main routine, executes a not shown interrupting process. In this interrupting process, the control circuit 51 stores logic levels of the voltages (i.e., positive or negative, or HIGH or LOW, or 1 or 0) of the first through third pulse signals in the RAM. In the present embodiment, the control circuit 51 repeats the interrupting process periodically. In another embodiment, the control circuit 51 may execute the interrupting process in response to the edges or the voltage levels of the first through third pulse signals or other signals.

2-6-3. Standby Determination Process

Figure 9:
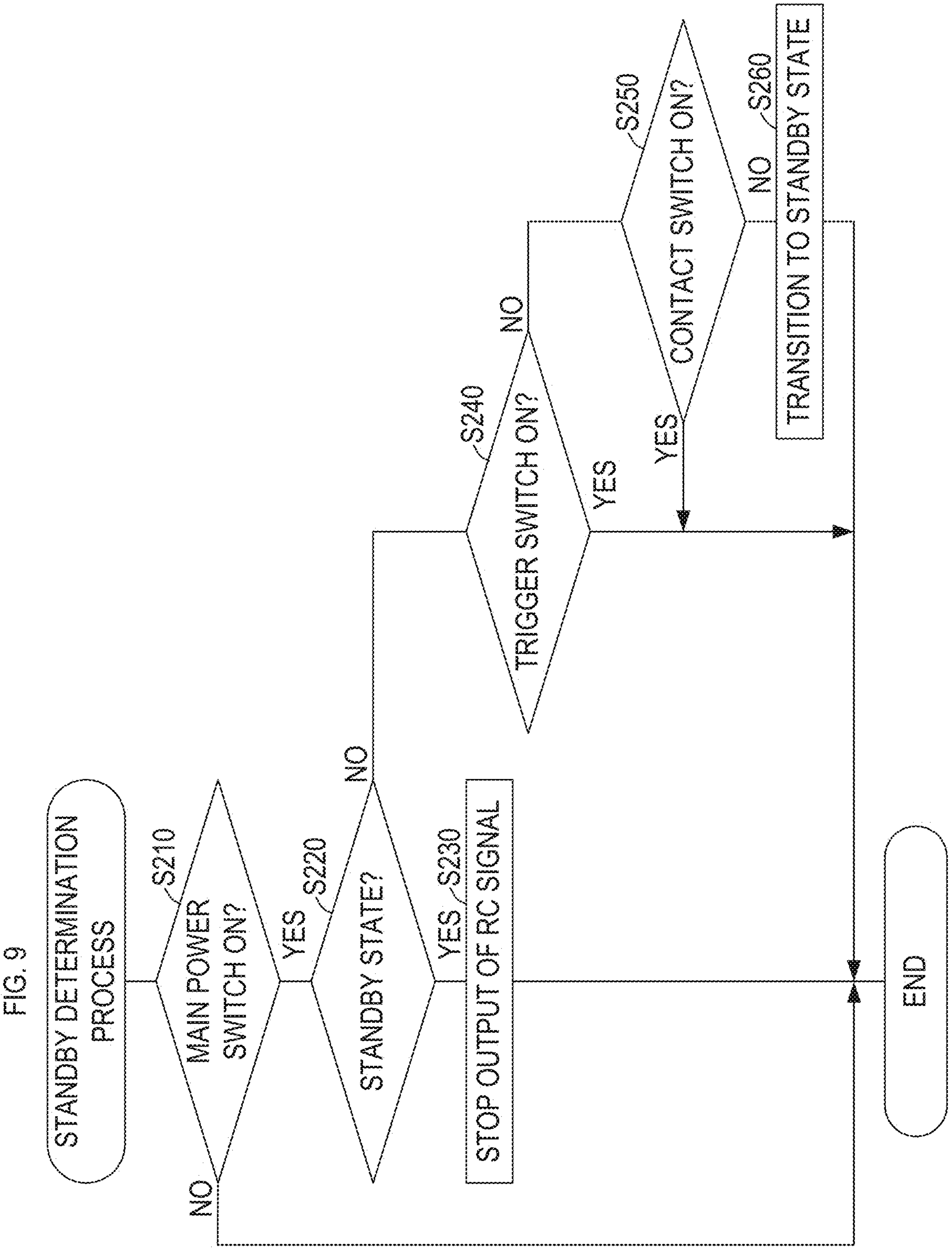
FIG. 9 is a flowchart showing a flow of a standby determination process executed by the control circuit.

As shown in FIG. 9, in the standby determination process, the control circuit 51 first determines whether the main power switch 36 is ON based on the logic level of the voltage of the main power switch 36 stored in the RAM in S210. When the main power switch 36 is not ON (S210: NO), the control circuit 51 immediately terminates the standby determination process.

When the main power switch 36 is ON (S210: YES), the control circuit 51 determines whether the reciprocating tool 1 is in a standby state. More specifically, the control circuit 51 determines whether a standby flag is set. The standby flag is cleared when the control circuit 51 is activated.

When the reciprocating tool 1 is in the standby state (S220: YES), the control circuit 51 proceeds to S230 to stop an output of the RC signal, and terminates the standby determination process. Consequently, the power-supply circuit 52 transitions into the OFF-state, and the power of the reciprocating tool 1 is turned OFF.

When the reciprocating tool 1 is not in the standby state (S220: NO), the control circuit 51 proceeds to S240 to determine whether the trigger switch 21 is ON. More specifically, the control circuit 51 determines whether the trigger switch 21 is ON based on the logic level of the output of the second latching circuit 58 stored in the RAM. In other words, the control circuit 51 determines whether the trigger switch 21 is ON based on whether the motor current is flowing.

When the trigger switch 21 is ON (S240: YES), the control circuit 51 immediately terminates the standby determination process. When the trigger switch 21 is OFF (S240: NO), the control circuit 51 proceeds to S250 to determine whether the contact switch 20 is ON based on the logic level of the voltage of the contact switch 20 stored in the RAM.

When the contact switch 20 is ON (S250: YES), the control circuit 51 immediately terminates the standby determination process. When the contact switch 20 is OFF (S250: NO), the control circuit 51 proceeds to S260 to transition the reciprocating tool 1 into the standby state, and terminates the standby determination process. In S260, the control circuit 51 (*i*) sets the standby flag and (ii) outputs the RC signal.

2-6-4. Motor Control Process

Figure 10:
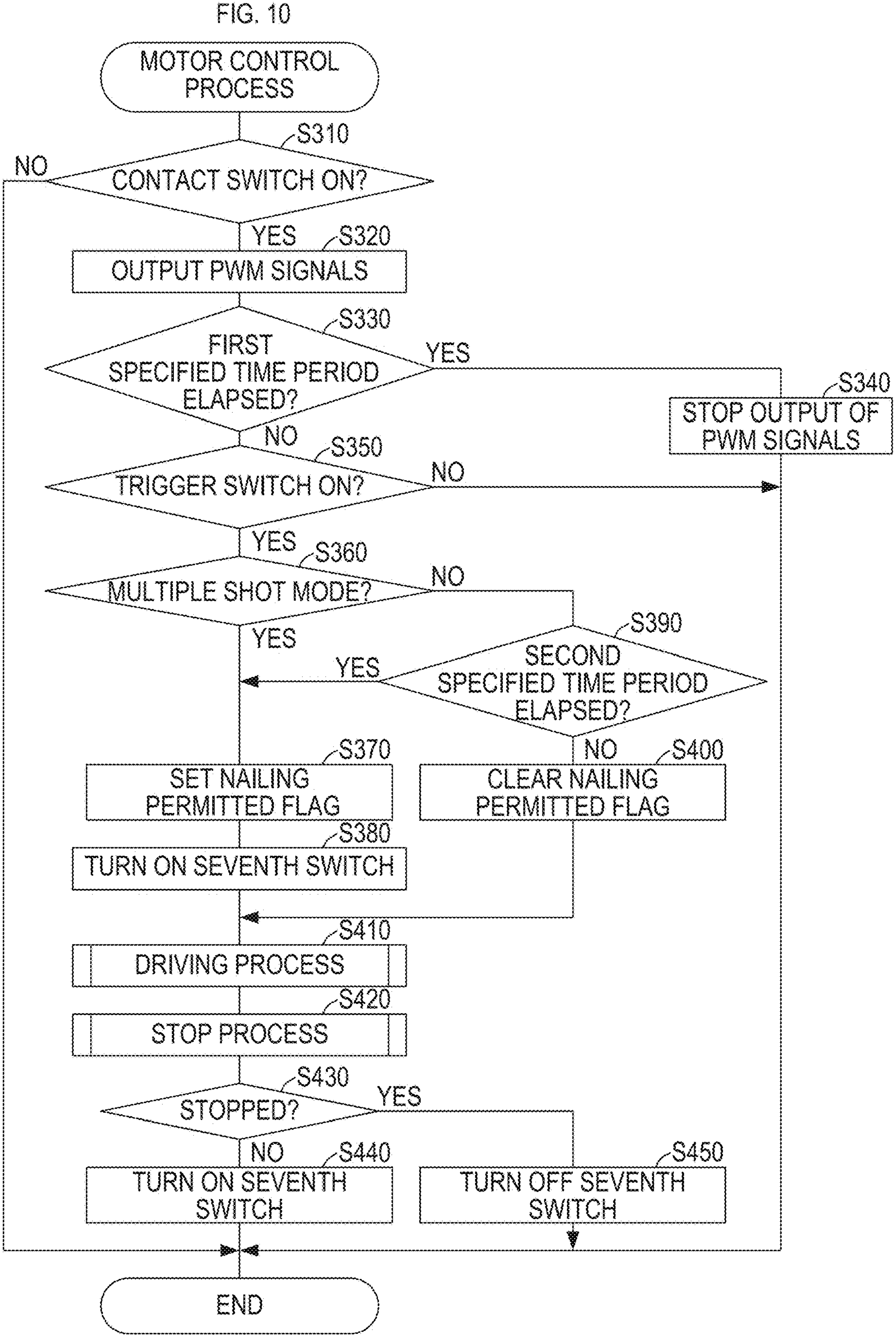
FIG. 10 is a flowchart showing a flow of a motor control process executed by the control circuit.

As shown in FIG. 10, in the motor control process, the control circuit 51 first determines whether the contact switch 20 is ON based on the logic level of the voltage of the contact switch 20 stored in the RAM in S310.

When the contact switch 20 is OFF (S310: NO), the control circuit 51 immediately terminates the motor control process. When the contact switch 20 is ON (S310: YES), the control circuit 51 proceeds to S320. In S320, the control circuit 51 outputs the corresponding PWM signals to the selected high-side and low-side switches (in other words, a combination of the high-side and low-side switches that fails the rotor 26 to rotate). Each of the corresponding PWM signals has the above-described initial duty ratio.

In subsequent S330, the control circuit 51 determines whether a first specified time period (for example, 5 seconds) has elapsed since the corresponding PWM signals started to be output. The first specified time period is set to ensure that a nail is not accidentally ejected when the pressing member 6 is held against some object contrary to the user's intention. When the first specified time period has elapsed (S330: YES), the control circuit 51 proceeds to S340 to stop outputting the corresponding PWM signals, and terminates the motor control process.

When the first specified time period has not elapsed (S330: NO), the control circuit 51 proceeds to S350 to determine whether the trigger switch 21 is ON based on the logic level of the output of the second latching circuit 58 stored in the RAM. When the trigger switch 21 is OFF (S350: NO), the control circuit 51 immediately terminates the motor control process.

When the trigger switch 21 is ON (S350: YES), the control circuit 51 proceeds to S360 to determine whether the reciprocating tool 1 is set to the multiple shot mode. More specifically, the control circuit 51 determines whether a multiple shot mode flag is set. The multiple shot mode flag is cleared when the control circuit 51 is activated. In the reciprocating tool 1, each time the user presses the mode selection switch 37, the operation mode of the reciprocating tool 1 is switched between the single shot mode and the multiple shot mode. Accordingly, the control circuit 51 sets or clears the multiple shot mode flag based on the logic level of the voltage of the mode selection switch 37 stored in the RAM.

When the reciprocating tool 1 is set to the multiple shot mode (S360: YES), the control circuit 51 proceeds to S370 to set a nailing permitted flag. The nailing permitted flag indicates that a nail is permitted to be driven. In subsequent S380, the control circuit 51 outputs the switch-ON signal to the seventh switch Q7 to turn ON the seventh switch Q7, and proceeds to S410.

When the reciprocating tool 1 is set to the single shot mode (S360: NO), the control circuit 51 proceeds to S390 to determine whether a second specified time period (for example, 50 milliseconds) has elapsed. The second specified time period is set to ensure that the reciprocating tool 1 does not drive a nail when an operation prohibited for the single shot mode, that is, pressing the pressing member 6 against a workpiece with the trigger 9 being pulled, is performed. When the second specified time period has elapsed (S390: YES), the control circuit 51 proceeds to S370.

When the second specified time period has not elapsed (S390: NO), the control circuit 51 proceeds to S400 to clear the nailing permitted flag.

In subsequent S410, the control circuit 51 executes a driving process.

In the driving process, when the nailing permitted flag is set, the control circuit 51 performs the above-described soft start. When the soft start is completed, the control circuit 51 sets the duty ratios of the PWM signals output to the selected high-side and low-side switches (in other words, the high-side and low-side switches that contribute to rotating the rotor 26) to 100%.

When the nailing permitted flag is cleared, the control circuit 51 immediately terminates the driving process.

In subsequent S420, the control circuit 51 executes a stop process. The stop process will be described later in detail.

When the stop process is completed, the control circuit 51 proceeds to S430 to determine whether the electric motor 24 is stopped. More specifically, the control circuit 51 determines whether a motor stopped flag is set. The motor stopped flag indicates that the electric motor 24 is stopped.

When the electric motor 24 is not stopped (in other words, the motor stopped flag is cleared) (S430: NO), the control circuit 51 proceeds to S440. In S440, the control circuit 51 outputs the switch-ON signal to the seventh switch Q7 to turn ON the seventh switch Q7. In other words, the control circuit 51 continues to output the switch-ON signal to the seventh switch Q7, and holds the seventh switch Q7 in its ON-state.

When the electric motor 24 is stopped (in other words, the motor stopped flag is set) (S430: YES), the control circuit 51 proceeds to S450. In S450, the control circuit 51 outputs the switch-OFF signal to the seventh switch Q7 to turn OFF the seventh switch Q7.

2-6-5. Stop Process

Figure 11:
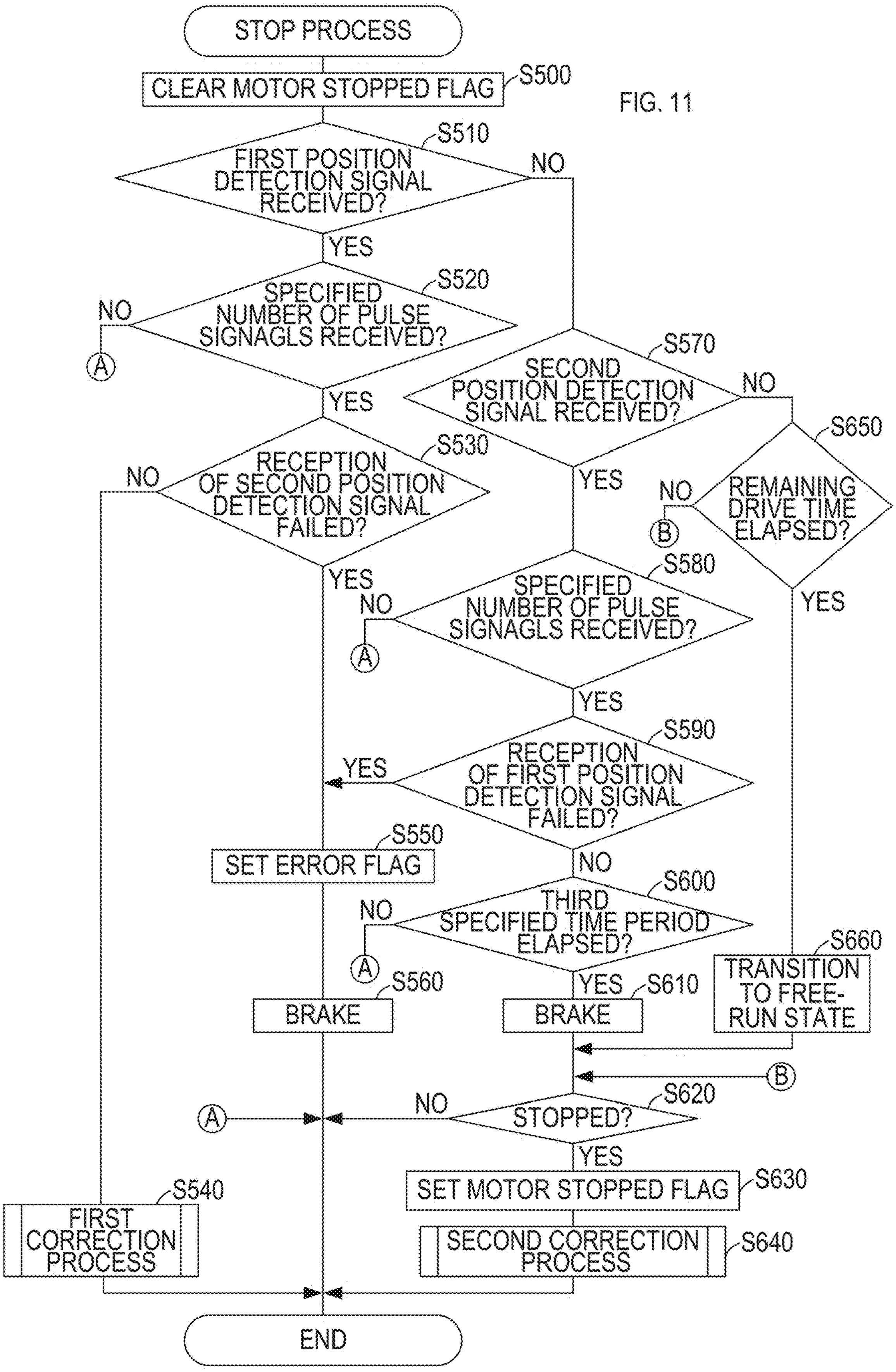
FIG. 11 is a flowchart showing a flow of a stop process executed by the control circuit.

As shown in FIG. 11, in the stop process, the control circuit 51 first clears the motor stopped flag in S500.

In subsequent S510, the control circuit 51 determines whether the first position detection signal is received based on the logic level of the voltage of the first Hall element 34*a* stored in the RAM.

When the control circuit 51 receives the first position detection signal (S510: YES), the control circuit 51 proceeds to S520. In S520, the control circuit 51 determines whether a total number of the first through third pulse signals received between the current reception (i.e., an mth reception; m is any integer greater than or equal to two) and the previous reception (i.e., an (m-1)th reception) of the first position detection signal has reached a specified number, based on the logic levels of the voltages of the first through third pulse signals stored in the RAM until this point in time. In the present embodiment, the specified number corresponds to a total number of the first through third pulse signals generated during one rotation of the cam 28.

When the total number of the first through third pulse signals has not reached the specified number (in other words, when the cam 28 has not made one rotation) (S520: NO), the control circuit 51 immediately terminates the stop process, and invalidates (or ignores) the current reception of the first position detection signal.

When the total number of the first through third pulse signals has reached the specified number (in other words, when the cam 28 has made one rotation) (S520: YES), the control circuit 51 proceeds to S530.

In S530, the control circuit 51 determines whether the control circuit 51 has failed to receive the second position detection signal between the current reception (i.e., the mth reception) and the previous reception (i.e., the (m-1)th reception) of the first position detection signal, based on the logic levels of the voltages of the first Hall element 34*a* and the second Hall element 34*b* stored in the RAM by this point in time.

When the control circuit 51 has received the second position detection signal (S530: NO), the control circuit 51 proceeds to S540 to execute a first correction process. The first correction process will be described later in detail. When the first correction process is completed, the control circuit 51 terminates the stop process.

When the control circuit 51 has failed to receive the second position detection signal (S530: YES), the control circuit 51 proceeds to S550 to set the error flag.

In subsequent S560, the control circuit 51 outputs the PWM signals each having the specified duty ratio (for example, 100%) to at least two of the fourth through sixth switches Q4 through Q6 so as to generate the dynamic braking in the electric motor 24, and terminates the stop process.

In S510, when the control circuit 51 does not receive the first position detection signal (S510: NO), the control circuit 51 proceeds to S570. In S570, the control circuit 51 determines whether the second position detection signal is received, based on the logic level of the voltage of the second Hall element 34*b* stored in the RAM.

When the control circuit 51 receives the second position detection signal (S570: YES), the control circuit 51 proceeds to S580 to determine whether the total number of the first through third pulse signals received between the current reception (i.e., an nth reception; n is any integer greater than or equal to two) and the previous reception (i.e., an (n-1)th reception) of the second position detection signal has reached the above-described specified number, based on the logic levels of the voltages of the first through third pulse signals stored in the RAM by this point in time.

When the total number of the first through third pulse signals has not reached the specified number (in other words, when the cam 28 has not made one rotation) (S580: NO), the control circuit 51 immediately terminates the stop process, and invalidates (or ignores) the current reception of the second position detection signal.

When the total number of the first through third pulse signals has reached the specified number (in other words, when the cam 28 has made one rotation) (S580: YES), the control circuit 51 proceeds to S590.

In S590, the control circuit 51 determines whether the control circuit 51 has failed to receive the first position detection signal between the current reception (i.e., the nth reception) and the previous reception (i.e., the (n-1)th reception) of the second position detection signal, based on the logic levels of the voltages of the first Hall element 34*a* and the second Hall element 34*b* stored in the RAM until this point in time.

When the control circuit 51 has failed to receive the first position detection signal (S590: YES), the control circuit 51 proceeds to S550.

When the control circuit 51 has received the first position detection signal (S590: NO), the control circuit 51 proceeds to S600.

In S600, the control circuit 51 determines whether predefined third specified time period has elapsed since the electric motor 24 started to be driven. The third specified time period is set to any time that does not elapse if the reciprocating tool 1 operates properly. When the third specified time period has not elapsed (S600: NO), the control circuit 51 immediately terminates the stop process.

When the third specified time period has elapsed (S600: YES), the control circuit 51 generates the dynamic braking in the electric motor 24 as in S560.

In subsequent S620, the control circuit 51 determines whether the electric motor 24 is stopped based on the logic levels of the voltages of the first through third pulse signals stored in the RAM until this point in time. When the electric motor 24 is not stopped (S620: NO), the control circuit 51 immediately terminates the stop process.

When the electric motor 24 is stopped (S620: YES), the control circuit 51 proceeds to S630 to set the motor stopped flag. In subsequent S640, the control circuit 51 executes a second correction process. The second correction process will be described later in detail.

When the second correction process is completed, the control circuit 51 terminates the stop process.

In S570, when the control circuit 51 does not receive the second position detection signal (S570: NO), the control circuit 51 proceeds to S650 to determine whether the remaining drive time has elapsed. The remaining drive time is calculated in the first correction process as described later.

When the remaining drive time has not elapsed (S650: NO), the control circuit 51 proceeds to S620. When the remaining drive time has elapsed (S650: YES), the control circuit 51 proceeds to S660.

In S660, the control circuit 51 set all the duty ratios of the first through sixth PWM signals to 0% to bring the electric motor 24 into the free-run state. Thereafter, the control circuit 51 proceeds to S620.

2-6-6. First Correction Process

Figure 12:
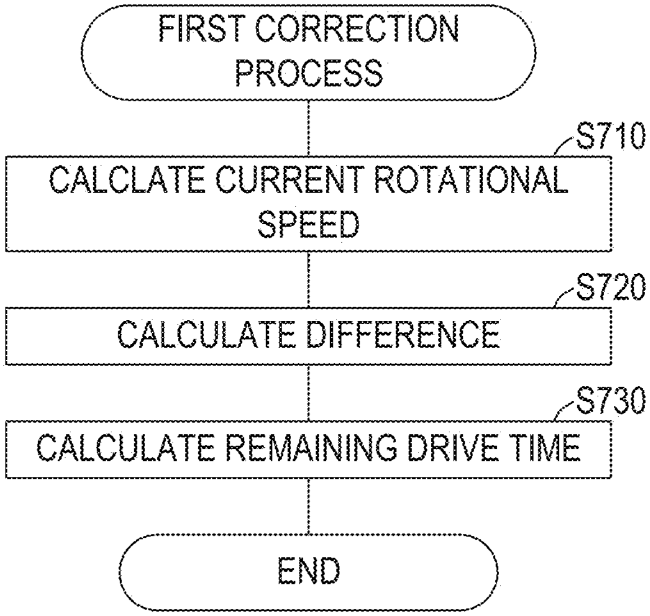
FIG. 12 is a flowchart showing a flow of a first correction process executed by the control circuit.

As shown in FIG. 12, in the first correction process, the control circuit 51 first calculates the current rotational speed of the electric motor 24 based on the logic levels of the voltages of the first through third pulse signals stored in the RAM until this point in time, in S710.

In subsequent S720, the control circuit 51 calculates a difference between (i) a predefined reference rotational speed and (ii) the calculated current rotational speed (i.e., the reference rotational speed—the current rotational speed).

Figure 13:
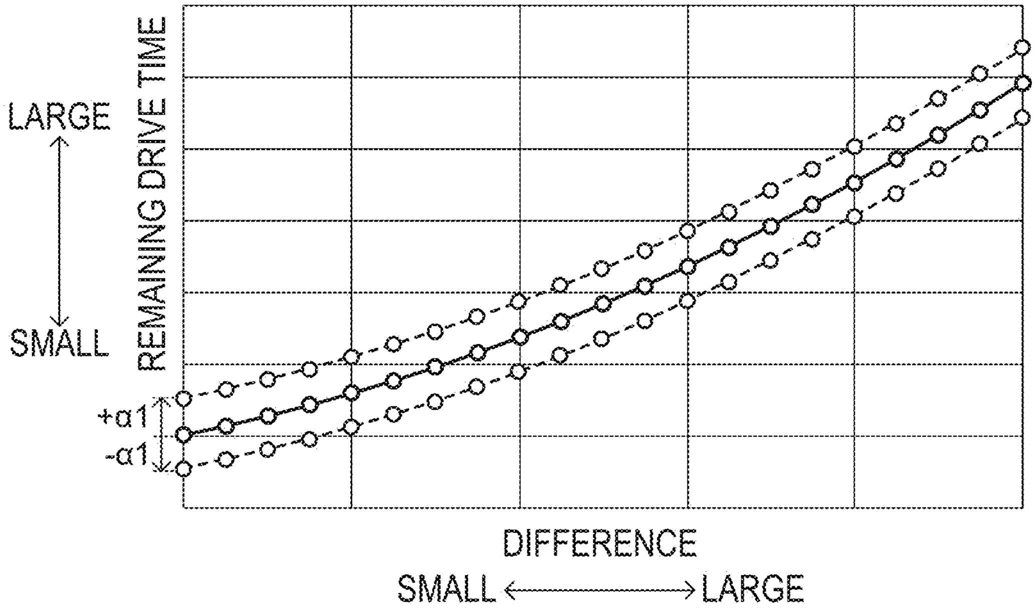
FIG. 13 is a graph showing an example of a function that is set to the control circuit.

In subsequent S730, the control circuit 51 calculates the remaining drive time based on the calculated difference. In the control circuit 51, the remaining drive time is defined as a function of the difference. In the present embodiment, the remaining drive time is a nonlinear function set to increase as the difference increases, as shown by a solid line in FIG. 13. In another embodiment, the remaining drive time may be a linear function of the difference.

2-6-7. Second Correction Process

Figure 14:
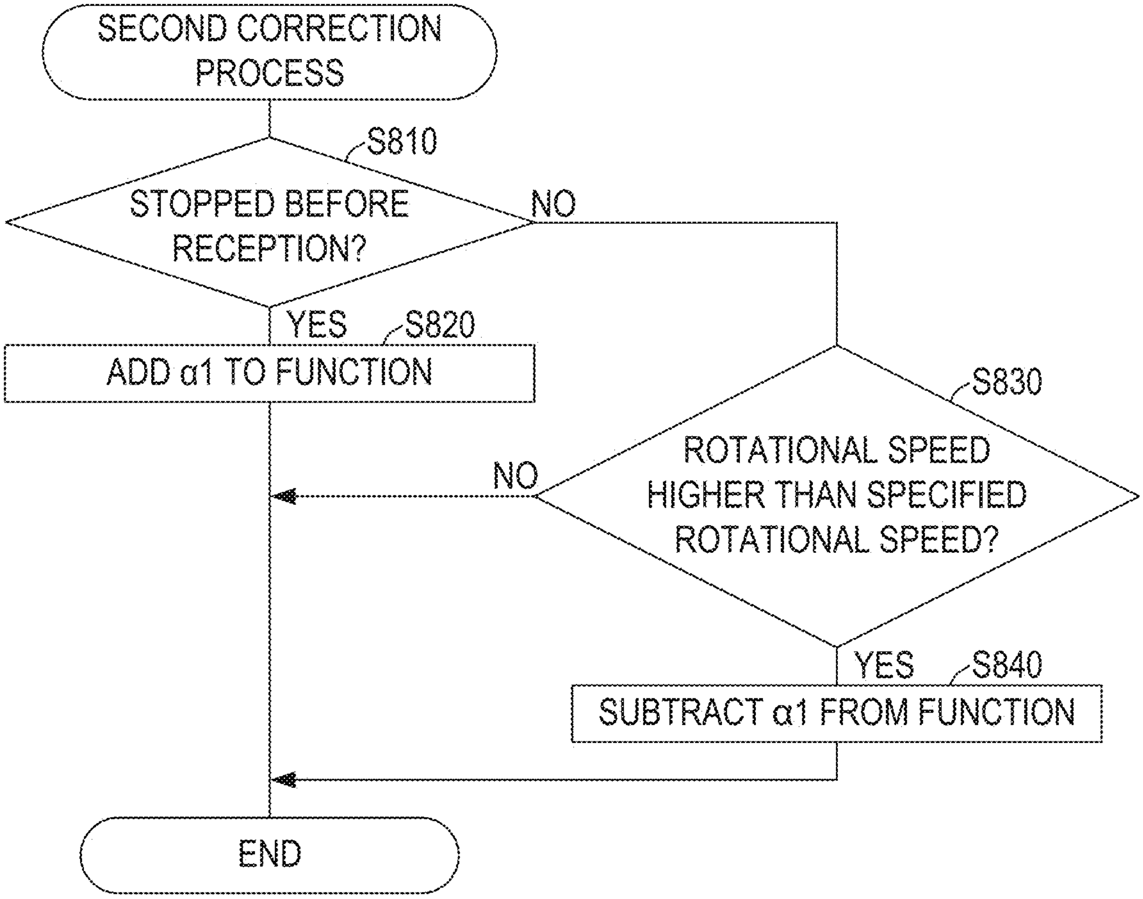
FIG. 14 is a flowchart showing a flow of a second correction process executed by the control circuit.

As shown in FIG. 14, in the second correction process, the control circuit 51 first determines whether the electric motor 24 is stopped before the control circuit 51 receives the second position detection signal, based on (i) the logic levels of the voltages of the second Hall element 34*b* stored in the RAM until this point in time and (ii) the logic levels of the voltages of the first through third pulse signals stored in the RAM until this point in time, in S810.

When the electric motor 24 is stopped before the control circuit 51 receives the second position detection signal (S810: YES), the control circuit 51 adds a fixed value al to the above-described function used in the first correction process in S820, as shown by an upper broken line in FIG. 13. Consequently, the remaining drive time calculated next in the first correction process increases by the fixed value al. The fixed value al is any predefined value.

When the electric motor 24 is not stopped before the control circuit 51 receives the second position detection signal (S810: NO), the control circuit 51 proceeds to S830 to determine whether the rotational speed of the electric motor 24 when the second position detection signal is received is higher than a specified rotational speed. This specified rotational speed is predefined. When the rotational speed of the electric motor 24 is lower than or equal to the specified rotational speed (S830: NO), the control circuit 51 immediately terminates the second correction process.

When the rotational speed of the electric motor 24 is higher than the specified rotational speed (S830: YES), the control circuit 51 proceeds to S840. In S840, the control circuit 51 subtracts the fixed value al from the function used in the first correction process as shown in a lower broken line in FIG. 13. Consequently, the remaining drive time calculated next in the first correction process decreases by the fixed value al. Thereafter, the control circuit 51 terminates the second correction process.

2-7. Technical Effects in Embodiment

In the reciprocating tool 1 configured as described above, occurrence of malfunction associated with position detection of the reciprocating member 18, more specifically, occurrence of malfunction associated with the first magnet 32, the second magnet 33, the first Hall element 34*a*, or the second Hall element 34*b* can be detected.

Figure 15:
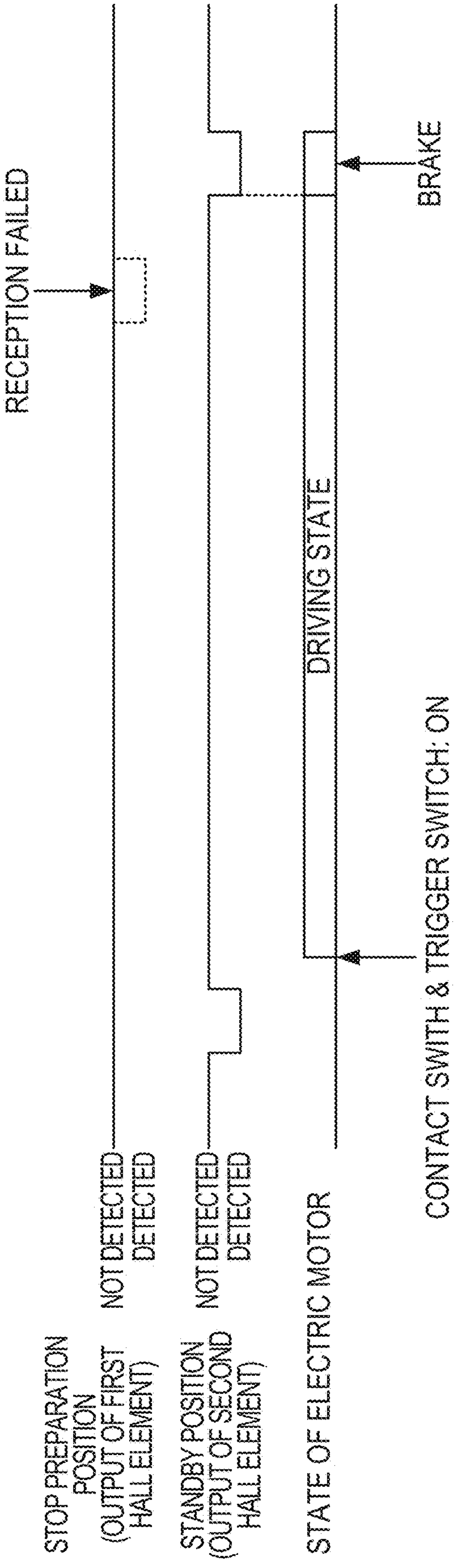
FIG. 15 is a timing diagram showing an example of an operation of an electric motor when malfunction occurs.

For example, as shown in FIG. 15, when malfunction is detected where the control circuit 51 has failed to receive the first position detection signal and receives the second position detection signal, the electric motor 24 is immediately stopped, and movement of the reciprocating member 18 is also immediately stopped. At this point in time, both the first indicator 38 and the second indicator 39 of the reciprocating tool 1 are turned ON, and the user is notified that malfunction has occurred.

Also, in the reciprocating tool 1, with the processes in S520 and S580, the control circuit 51 can be inhibited from erroneously detecting occurrence of malfunction in a situation where the control circuit 51 receives electrical noise as the first position detection signal or the second position detection signal at a timing when the electric motor 24 has not brought the reciprocating member 18 to the stop preparation position or the standby position.

Also, the reciprocating tool 1 is configured to detect the position of the reciprocating member 18 using a magnetic field. Thus, the reciprocating tool 1 has great durability, compared with if the reciprocating tool 1 were configured to mechanically detect the position of the reciprocating member 18. Furthermore, the reciprocating tool 1 as such is not susceptible to dust in position detection of the reciprocating member 18, compared with if the reciprocating tool 1 were configured to optically detect the position of the reciprocating member 18.

Also, in the reciprocating tool 1, since the first Hall element 34*a* and the second Hall element 34*b* are disposed outward from the holder 31 in the radial direction of the holder 31, the size of the reciprocating tool 1 in a direction intersecting the radial direction of the holder 31 can be reduced.

Also, in the reciprocating tool 1, since the holder 31 is a non-magnetic member, it can be easier for the first Hall element 34*a* or the second Hall element 34*b* to detect the south pole of the first magnet 32 or the north pole of the second magnet 33.

2-8. Correspondence Between Terms

In the present embodiment, the top dead center of the reciprocating member 18 corresponds to an example of the first dead center in Overview of Embodiments, and the bottom dead center of the reciprocating member 18 corresponds to an example of the second dead center in Overview of Embodiments. The stop preparation position corresponds to an example of the first position in Overview of Embodiments, and the standby position corresponds to an example of the second position in Overview of Embodiments. The trigger switch 21 corresponds to an example of the first manual switch in Overview of Embodiments, and the contact switch 20 corresponds to an example of the second manual switch in Overview of Embodiments. The south pole of the first magnet 32 corresponds to an example of the first magnetic pole in Overview of Embodiments, and the north pole of the second magnet 33 corresponds to an example of the second magnetic pole in Overview of Embodiments. Each of the first through third pulse signals corresponds to an example of the rotational position signal in Overview of Embodiments.

2-9. Variations

The present disclosure is not limited to the above-described embodiment, and can be practiced in various manners.

In one variation, the holder 31 may include only the first magnet 32 or only the second magnet 33, and the Hall effect IC 34 may include only the first Hall element 34*a* or only the second Hall element 34*b*.

In this case, the control circuit 51 may detect occurrence of malfunction associated with the first magnet 32 or the first Hall element 34*a* based on the total number of the first through third pulse signals received between the mth reception and the (m-1)th reception of the first position detection signal having not reached the above-described specified number.

Alternatively, the control circuit 51 may detect occurrence of malfunction associated with the second magnet 33 or the second Hall element 34*b* based on the total number of the first through third pulse signals received between the nth reception and the (n-1)th reception of the second position detection signal having not reached the above-described specified number.

In one variation, S600 in the stop process may be eliminated.

In one variation, the standby position of the reciprocating member 18 may differ from the position to stop the reciprocating member 18.

2-10. Supplementary Explanation

Two or more functions achieved by one element of the above-described embodiment may be achieved by two or more elements. One function achieved by one element may be achieved by two or more elements. Two or more functions achieved by two or more elements may be achieved by one element. One function achieved by two or more elements may be achieved by one element. A part of the configurations in the above-described embodiment may be omitted. At least a part of the configurations in the above-described embodiment may be added to or replaced with another part of the configurations in the above-described embodiment.

What is claimed is:

1. A reciprocating tool comprising:

a reciprocating member configured to reciprocate between a first dead center and a second dead center;

a first position detector configured to output a first position detection signal each time the reciprocating member reaches a first position in at least one reciprocating motion thereof;

a second position detector (i) distinct from the first position detector, and (ii) configured to output a second position detection signal each time the reciprocating member reaches a second position in the at least one reciprocating motion thereof, the second position being located after the first position in the at least one reciprocating motion of the reciprocating member; and a control circuit configured to:

receive the first position detection signal from the first position detector;

receive the second position detection signal from the second position detector; and detect an occurrence of malfunction associated with the first position detector or the second position detector based on (i) the control circuit having failed to receive the second position detection signal between an mth reception and an (m-1)th reception of the first position detection signal or (ii) the control circuit having failed to receive the first position detection signal between an nth reception and an (n-1)th reception of the second position detection signal, wherein m and n are any integers greater than or equal to two.

2. The reciprocating tool according to claim 1, further comprising:

a first manual switch configured to be manually operated by a user of the reciprocating tool;

an electric motor configured to generate a driving force;

a drive circuit configured to drive the electric motor; and a transmission device configured to transmit the driving force of the electric motor to the reciprocating member at least in a stroke of the reciprocating member from the second dead center to the first dead center, wherein the control circuit is configured to control the drive circuit so as to drive the electric motor based on at least the first manual switch being manually operated.

3. The reciprocating tool according to claim 2, wherein the transmission device includes a reducer (i) having a preset deceleration ratio, and (ii) configured to convert the driving force of the electric motor into a decelerated output and transmit the decelerated output to the reciprocating member.

4. The reciprocating tool according to claim 2, wherein the control circuit is configured to control the drive circuit so as to stop driving of the electric motor based on the control circuit detecting the occurrence of malfunction.

5. The reciprocating tool according to claim 2, wherein the control circuit is configured to control the drive circuit so as to brake the electric motor based on the control circuit detecting the occurrence of malfunction.

6. The reciprocating tool according to claim 2, wherein:

the electric motor includes a rotor;

the reciprocating tool includes a rotational position detector configured to output, to the control circuit, a rotational position signal indicating that the rotor has rotated by a specified angle; and the control circuit is configured to invalidate the mth reception of the first position detection signal or the nth reception of the second position detection signal based on (i) failure to receive a predefined number of rotational position signals from the rotational position detector between the mth reception and the (m-1)th reception of the first position detection signal, or (ii) failure to receive the predefined number of rotational position signals from the rotational position detector between the nth reception and the (n-1)th reception of the second position detection signal.

7. The reciprocating tool according to claim 2, wherein:

the control circuit is configured to output a pulse-width modulated signal to the drive circuit to control the drive circuit; and the drive circuit is configured to drive the electric motor based on the pulse-width modulated signal.

8. The reciprocating tool according to claim 2, further comprising:

a pressing member configured to be pressed against a workpiece by the user; and a second manual switch configured to be manually operated by the pressing member being pressed against the workpiece, wherein the control circuit is configured to control the drive circuit so as to drive the electric motor based on both the first manual switch and the second manual switch being manually operated.

9. The reciprocating tool according to claim 2, further comprising:

a cylinder containing compressed gas therein; and a piston that (i) is inside the cylinder, and (ii) urges the reciprocating member toward the second dead center by the compressed gas, wherein the reciprocating member is configured to be driven from the first dead center to the second dead center by the piston.

10. The reciprocating tool according to claim 9, wherein the reciprocating member is configured (i) to be positioned at the first dead center in response to the piston being positioned at a top dead center, and (ii) to be positioned at the second dead center in response to the piston being positioned at a bottom dead center.

11. The reciprocating tool according to claim 1, wherein:

the first position detector includes (i) a first magnet and (ii) a first Hall element configured to detect a first magnetic pole of the first magnet, and is configured such that the first Hall element detects the first magnetic pole of the first magnet and outputs the first position detection signal in response to the reciprocating member having reached the first position;

the second position detector includes (i) a second magnet and (ii) a second Hall element configured to detect a second magnetic pole of the second magnet, and is configured such that the second Hall element detects the second magnetic pole of the second magnet and outputs the second position detection signal in response to the reciprocating member having reached the second position; and the second magnetic pole has a polarity opposite to that of the first magnetic pole.

12. The reciprocating tool according to claim 1, further comprising:

a first manual switch configured to be manually operated by a user of the reciprocating tool;

an electric motor configured to generate a driving force;

a drive circuit configured to drive the electric motor; and a transmission device configured to transmit the driving force of the electric motor to the reciprocating member at least in a stroke of the reciprocating member from the second dead center to the first dead center, wherein:

the control circuit is configured to control the drive circuit so as to drive the electric motor based on at least the first manual switch being manually operated, the first position detector includes (i) a first magnet and (ii) a first Hall element configured to detect a first magnetic pole of the first magnet, and is configured such that the first Hall element detects the first magnetic pole of the first magnet and outputs the first position detection signal in response to the reciprocating member having reached the first position;

the second position detector includes (i) a second magnet and (ii) a second Hall element configured to detect a second magnetic pole of the second magnet, and is configured such that the second Hall element detects the second magnetic pole of the second magnet and outputs the second position detection signal in response to the reciprocating member having reached the second position; and the second magnetic pole has a polarity opposite to that of the first magnetic pole.

13. The reciprocating tool according to claim 12, wherein:

the transmission device includes:

a cam (i) including an outer circumference having two or more pins aligned in a circumferential direction of the cam, and (ii) configured to rotate by the driving force of the electric motor; and a holder (i) holding the first magnet and the second magnet, and (ii) configured to rotate with the cam; and the reciprocating member (i) extends in a direction between the first dead center and the second dead center, (ii) includes two or more racks in the extending direction, and (iii) is configured to be driven from the second dead center to the first dead center by each of the two or more racks engaging with a corresponding one of the two or more pins.

14. The reciprocating tool according to claim 13, wherein the first magnetic pole and the second magnetic pole face outward in a radial direction of the holder.

15. The reciprocating tool according to claim 13, wherein the cam and the holder are configured to rotate around a common axis.

16. The reciprocating tool according to claim 15, wherein the electric motor includes a rotor serving as the common axis.

17. The reciprocating tool according to claim 13, wherein the holder is a non-magnetic member.

18. The reciprocating tool according to claim 1, wherein:

the first position corresponds to a stop preparation position to prepare for a stopping operation of the reciprocating member; and the second position corresponds to (i) a stop position to stop the reciprocating member, and/or (ii) a standby position where the reciprocating member waits for at least one next reciprocating motion of the reciprocating member.

19. A method for detecting occurrence of malfunction associated with position detection of a reciprocating member in a reciprocating tool, the method comprising:

reciprocating the reciprocating member between a first dead center and a second dead center;

receiving a first position detection signal from a first position detector in the reciprocating tool, the first position detector being configured to output the first position detection signal each time the reciprocating member reaches a first position in at least one reciprocating motion thereof;

receiving a second position detection signal from a second position detector in the reciprocating tool, the second position detector being (i) distinct from the first position detector, and (ii) configured to output the second position detection signal each time the reciprocating member reaches a second position in the at least one reciprocating motion thereof, the second position being located after the first position in the at least one reciprocating motion of the reciprocating member; and detecting an occurrence of malfunction associated with the first position detector or the second position detector based on (i) failure to receive the second position detection signal between an mth reception and an (m-1)th reception of the first position detection signal, or (ii) failure to receive the first position detection signal between an nth reception and an (n-1)th reception of the second position detection signal, wherein m and n are any integers greater than or equal to two.

* * * * *